United States Patent
Yamashita et al.

(10) Patent No.: US 9,958,175 B2
(45) Date of Patent: May 1, 2018

(54) AIR-CONDITIONING APPARATUS

(71) Applicant: Mitsubishi Electric Corporation, Chiyoda-ku, Tokyo (JP)

(72) Inventors: Koji Yamashita, Tokyo (JP); Hiroyuki Morimoto, Tokyo (JP); Yuji Motomura, Tokyo (JP); Takeshi Hatomura, Tokyo (JP)

(73) Assignee: MITSUBISHI ELECTRIC CORPORATION, Chiyoda-ku, Tokyo (JP)

( * ) Notice: Subject to any disclaimer, the term of this patent is extended or adjusted under 35 U.S.C. 154(b) by 35 days.

(21) Appl. No.: 14/685,109

(22) Filed: Apr. 13, 2015

(65) Prior Publication Data

US 2015/0219351 A1 Aug. 6, 2015

Related U.S. Application Data

(63) Continuation of application No. 13/055,810, filed as application No. PCT/JP2008/069607 on Oct. 29, 2008, now abandoned.

(51) Int. Cl.
*F25D 17/02* (2006.01)
*F24F 11/00* (2018.01)
(Continued)

(52) U.S. Cl.
CPC ............. *F24F 11/001* (2013.01); *F24F 3/06* (2013.01); *F24F 11/30* (2018.01); *F24F 11/70* (2018.01);
(Continued)

(58) Field of Classification Search
CPC ........ F24F 11/001; F24F 11/0076; F24F 3/06; F24F 11/008
See application file for complete search history.

(56) References Cited

U.S. PATENT DOCUMENTS 2,672,016 A * 3/1954 Muffly ...................... F25C 1/08
62/137
3,848,664 A 11/1974 Perry et al.
3,864,934 A 2/1975 Jeding et al.

FOREIGN PATENT DOCUMENTS

JP 3-017475 A 1/1991
JP 05-203276 A 8/1993
(Continued)

OTHER PUBLICATIONS

Hideaki, Operation Controlling Method for Air Conditioner, May 16, 1995, JPH07127894A, Whole Document.*
(Continued)

*Primary Examiner* — Larry Furdge
(74) *Attorney, Agent, or Firm* — Buchanan Ingersoll & Rooney PC

(57) ABSTRACT

To provide an air-conditioning apparatus that is safer and has small conveying power for such as water at the indoor unit side can be made small. It is characterized in that a compressor 10 and a heat source side heat exchanger 12 are accommodated in a heat source apparatus 1, an intermediate heat exchanger 15 and a pump 21 in a relay unit 3, a use side heat exchanger 26 in an indoor unit 2, respectively, and when a controller 60 makes the compressor 10 stop based on the thermo-off due to decrease in the heat load in the use side heat exchanger 26 or an operation stop instruction, the controller 60 makes the pump 21 stop after the compressor 10 is stopped or almost at the same time as the stop.

9 Claims, 15 Drawing Sheets

(51) Int. Cl.
*F24F 3/06* (2006.01)
*F25B 13/00* (2006.01)
*F25B 25/00* (2006.01)

(52) U.S. Cl.
CPC .............. *F24F 11/83* (2018.01); *F25B 13/00* (2013.01); *F25B 25/005* (2013.01); *F24F 11/65* (2018.01); *F24F 2110/00* (2018.01); *F24F 2140/60* (2018.01); *F25B 2309/061* (2013.01); *F25B 2313/006* (2013.01); *F25B 2313/023* (2013.01); *F25B 2313/0231* (2013.01); *F25B 2313/0232* (2013.01); *F25B 2313/0233* (2013.01); *F25B 2313/0272* (2013.01); *F25B 2313/02741* (2013.01); *F25B 2313/0311* (2013.01); *F25B 2313/0314* (2013.01); *F25B 2500/221* (2013.01); *F25B 2500/27* (2013.01); *F25B 2600/13* (2013.01); *Y02B 30/745* (2013.01)

(56) References Cited

FOREIGN PATENT DOCUMENTS

| JP | 5-280818 A | | 10/1993 |
|---|---|---|---|
| JP | 7-127894 A | | 5/1995 |
| JP | H07127894 A | * | 5/1995 |
| JP | 2002-115920 A | | 4/2002 |
| JP | 2003-343936 A | | 12/2003 |
| JP | 2004-044948 A | | 2/2004 |
| JP | 2004-053069 A | | 2/2004 |
| JP | 2004044948 A | * | 2/2004 |
| JP | 2004086726 A | * | 3/2004 |
| JP | 2006-029744 A | | 2/2006 |

OTHER PUBLICATIONS

Masami, Food Cooling/Heating Device, Mar. 18, 2004, JP2004086726A, Whole Document.*
Yukio et al., Air Conditioner, Feb. 12, 2004, JP2004044948A, Whole Document.*
International Search Report (PCT/ISA/210) dated Jan. 27, 2009, by the Japanese Patent Office as the International Searching Authority for International Application No. PCT/JP2008/069607.
Japanese Office Action (Notice of Reasons for Rejection) dated Aug. 14, 2012, issued in correspoding Japanese Patent Application 2010-535547. (5 pages).
First Office Action dated Feb. 26, 2013 in corresponding Chinese Patent Application No. 200880130521.1, and an English translation thereof.
Chinese Office Action (Second Office Action) dated Aug. 27, 2013, issued in corresponding Chinese Application No. 2008801305211, and an English Translation of the Office Action thereof. (8 pages).
Extended Search Report dated Oct. 23, 2014, by the European Patent Office in corresponding European Patent Application No. 08877716.4-1602 (8 pages).
Extended European Search Report dated Jan. 18, 2018 in corresponding European Patent Application No. 17197446.2.

* cited by examiner

AIR-CONDITIONING APPARATUS

TECHNICAL FIELD

The present invention relates to an air-conditioning apparatus used for a multiple-air conditioner for buildings for example.

BACKGROUND ART

Conventionally, there is a multi-air conditioner for buildings for which an air-conditioning apparatus is applied in which, by making a refrigerant circulate between an outdoor unit, which is a heat source installed outdoors, and an indoor unit installed indoors, cooling energy or heating energy is transferred to an area to be air-conditioned such as an inside of a room, and cooling operation or heating operation is adapted to be performed. As for the refrigerant employed by such the air-conditioning apparatus, for example, an HFC type refrigerant is often used. In recent years, a natural refrigerant such as carbon-dioxide ($CO_2$) has come to be used.

There is an air-conditioning apparatus having other configurations represented by a chiller system. In such an air-conditioning apparatus, cooling energy or heating energy is generated in the heat source apparatus installed outdoors, the cooling energy or heating energy is transferred to a heat medium such as water and an antifreezing liquid through a heat exchanger installed in the indoor unit, and they are transferred to such as a fan coil unit or a panel heater, which is an indoor unit installed in the area to be air-conditioned, to perform cooling operation or heating operation. (For example, refer to Patent Literature 1.)

CITATION LIST

Patent Literature

Patent Literature 1 Japanese Patent No. 2003-343936 (page 5, FIG. 1)

SUMMARY OF INVENTION

Technical Problem

In the conventional air-conditioning apparatus, since a high-pressure refrigerant is transferred into the indoor unit and utilized, when the refrigerant leaks indoors, users might be subjected to adverse effects. The chiller exchanges heat between the refrigerant and water outdoors and transfers water into the indoor unit, so that conveying power of water is too large to be energy-saving disadvantageously.

The present invention is made to solve the above-mentioned problems and its purpose is to provide an air-conditioning apparatus that is safer and has small conveying power for such as water in the indoor unit side.

The air-conditioning apparatus according to the present invention has:

at least one unit of an intermediate heat exchanger that exchanges heat between a refrigerant undergoing two-phase change or a refrigerant under a supercritical condition and a heat medium which is different from the refrigerant such as water and antifreezing liquid;

a refrigeration cycle in which a compressor, an outdoor heat exchanger, at least one expansion valve, and a refrigerant side flow path of the intermediate heat exchanger are connected via piping through which the refrigerant flows;

a heat medium circulation circuit in which a heat medium side flow path of the intermediate heat exchanger, a pump, and a use side heat exchanger are connected via piping through which the heat medium flows; and a controller that controls drive of the compressor and the pump.

The compressor and the outdoor heat exchanger are accommodated in a heat source apparatus.

The intermediate heat exchanger and the pump are accommodated in a relay unit.

The use side heat exchanger is accommodated in an indoor unit.

When the compressor is stopped based on the thermo-off due to decrease in the air-conditioning load in the use side heat exchanger or an operation stop instruction, the controller makes the pump stop after or almost at the same time of the stop of the compressor.

Advantageous Effects of Invention

According to the air-conditioning apparatus of the present invention, stable operation can be continued. It is possible to prevent refrigeration cycle operation efficiency from deteriorating such that the high-pressure of the refrigerant fluctuates and improve system efficiency, surely achieving high energy-saving performance.

Figure 1:
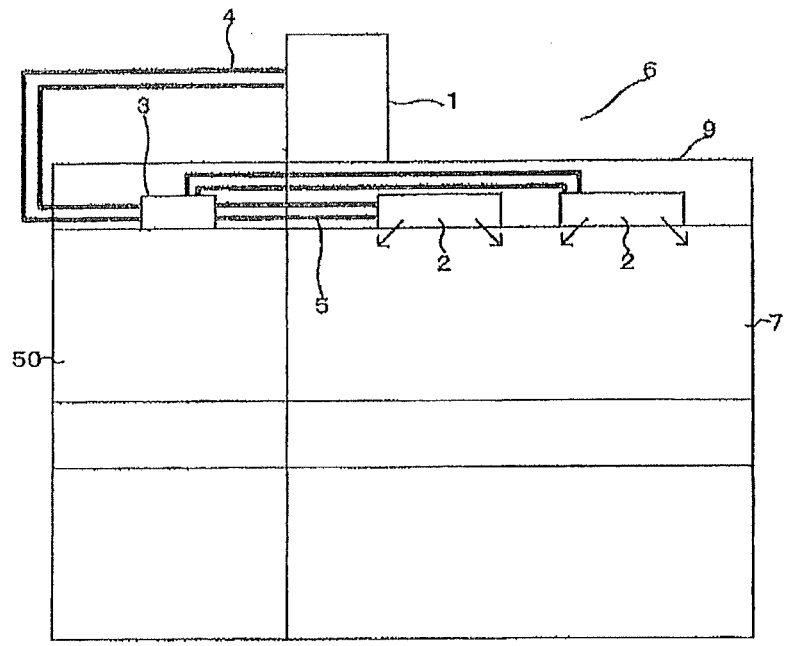
FIG. 1 is a total configuration diagram showing an example of an installation condition of an air-conditioning apparatus according to Embodiment 1.

REFERENCE SIGNS LIST 1 heat source apparatus (outdoor unit)
2, 2a, 2b, 2c, 2d indoor unit
3 relay unit
3a first relay unit
3b second relay unit
4 refrigerant pipeline
4a first connection pipeline
4b second connection pipeline
5, 5a, 5b pipeline
6 outdoor space
7 living space
9 building
10 compressor
11 four-way valve
12 heat source side heat exchanger
13a, 13b, 13c, 13d check valve
14 gas-liquid separator
15 intermediate heat exchanger
15a first intermediate heat exchanger
15b second intermediate heat exchanger
16a, 16b, 16c, 16d, 16e expansion valve
17 accumulator
21 pump
21a first pump
21b second pump
22, 22a, 22b, 22c, 22d flow path switching valve
23, 23a, 23b, 23c, 23d flow path switching valve
24, 24a, 24b, 24c, 24d stop valve
25, 25a, 25b, 25c, 25d flow amount adjustment valve
26, 26a, 26b, 26c, 26d use side heat exchanger
27, 27a, 27b, 27c, 27d bypass
31, 31a, 31b first temperature sensor
32, 32a, 32b second temperature sensor
33, 33a, 33b, 33c, 33d third temperature sensor
34, 34a, 34b, 34c, 34d fourth temperature sensor
35 fifth temperature sensor
36 pressure sensor
37 sixth temperature sensor
38 seventh temperature sensor
50 non-living space
60 controller
100 air-conditioning apparatus
125, 125a, 125b, 125c, 125d flow amount adjustment valve
200 air-conditioning apparatus

DESCRIPTION OF EMBODIMENTS

Embodiment 1

Hereinafter, descriptions will be given to embodiments of the present invention.

Embodiment 1

Figure 2:
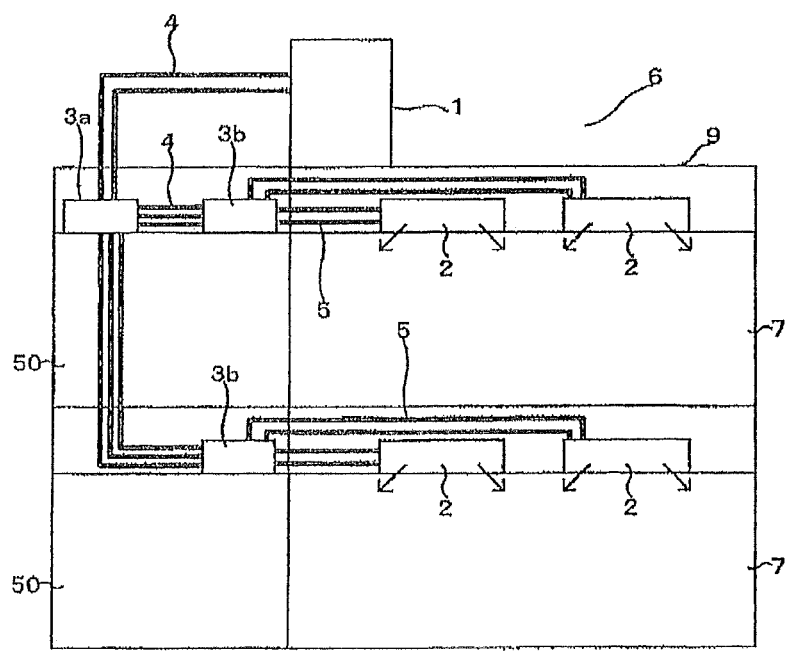
FIG. 2 is a total configuration diagram showing an example of an installation condition of an air-conditioning apparatus according to Embodiment 1.

FIGS. 1 and 2 are a total configuration diagram showing an example of an installation condition of an air-conditioning apparatus according to Embodiment 1. Based on FIGS. 1 and 2, descriptions will be given to the configuration of the air-conditioning apparatus. The air-conditioning apparatus performs cooling operation or heating operation using a refrigeration cycle (a refrigeration cycle and a heat medium circulation circuit) that circulates a refrigerant (a heat source side refrigerant and a heat medium (such as water and antifreezing liquid)). In some following drawings including FIG. 1, the size of each component member may be different from actual size.

As shown in FIG. 1, the air-conditioning apparatus has: one unit of a heat source apparatus 1, which is a heat source unit; two or more indoor units 2; and a relay unit 3 that intervenes between the heat source apparatus 1 and the indoor unit 2. The relay unit 3 exchanges heat between a heat source refrigerant and a heat medium. The heat source apparatus 1 and the relay unit 3 are connected by a refrigerant pipeline 4 that makes the heat source refrigerant flow through. The relay unit 3 and the indoor unit 2 are connected by a pipeline 5 that makes the heat medium flow through. Cooling energy or heating energy generated in the heat source apparatus 1 is adapted to be delivered into the indoor unit 2. The numbers of connected units of the heat source apparatus 1, the indoor unit 2, and the relay unit 3 are not limited to those shown in the figure.

The heat source apparatus 1 is usually disposed in an outdoor space 6, which is a space outside of the building 9 and the like and supplies the indoor unit 2 with cooling energy or heating energy via the relay unit 3. The indoor unit 2 is disposed at a living space 7 such as a living room inside the building 9 into which the cooling air or heating air can be transferred and server room and supplies the living space 7 to be an air-conditioning subject space with the cooling air or heating air. The relay unit 3 is, as a separate body from the heat source apparatus 1 and indoor unit 2, configured to be disposed in a position (hereinafter, referred to as a non-living space 50) different from the outdoor space 6 and living space 7, connects the heat source apparatus 1 and indoor unit 2, and transfers cooling energy or heating energy supplied by the heat source apparatus 1 to the indoor unit 2.

The outdoor space 6 is a place existing outside of the building 9, giving an impression of a rooftop shown in FIG. 1, for example. The non-living space 50 is a space different from the living apace 7, however inside the building 9, giving an impression of a place where there are not always people like on a hall way, under the roof of a common zone, a common section including an elevator and the like, a machine room, a computer room, a warehouse or the like. The living apace 7 is inside the building 9, giving an impression of a place where there are always people or a place where there are a number of or few people temporarily, for example, an office, a class room, a conference room, a dining, a server room or the like.

The heat source apparatus 1 and relay unit 3 are connected using two refrigerant pipelines 4. The relay unit 3 and each indoor unit 2 are connected by two pipelines 5 respectively. Thus, by connecting the heat source apparatus 1 with the relay unit 3 by two refrigerant pipelines 4 and by connecting the indoor unit 2 with the relay unit 3 by two pipelines 5, construction of the air-conditioning apparatus is facilitated.

As shown in FIG. 2, the relay unit 3 may be configured by being divided into one first relay unit 3a and two second relay units 3b derived from the first relay unit 3a. Thus, two or more second relay units 3b can be connected with one first relay unit 3a. In this configuration, there are three refrigerant pipelines 4 between the first relay unit 3a and second relay units 3b. Detailed descriptions will be given later to details of the pipeline path.

In FIGS. 1 and 2, the indoor unit 2 is shown using a ceiling cassette type as an example. However, it is not limited thereto, but it may be any type as long as cooling energy or heating energy can be blown off into the living space 7 directly or via a duct. For example, a ceiling-concealed type or a ceiling-suspended type is allowable.

In FIG. 1, although a case where the heat source apparatus 1 is installed in the outdoor space 6 is shown as an example, it is not limited thereto. For example, the heat source apparatus 1 may be installed in a surrounded space such as a machine room with a ventilating hole, may be installed inside a building 9 as long as heat can be exhausted by an exhaust duct outside the building 9, or may be installed in the building 9 when employing a water-cooled type heat source apparatus 1. Even if the heat source apparatus 1 is installed in such places, no problem will occur in particular.

Further, the relay unit 3 may be installed in the vicinity of the heat source apparatus 1. However, when the distance between the relay unit 3 and the indoor unit 2 is too long, carrying power of the heat medium becomes considerably large, resulting in the reduction of power-saving effect.

Figure 3:
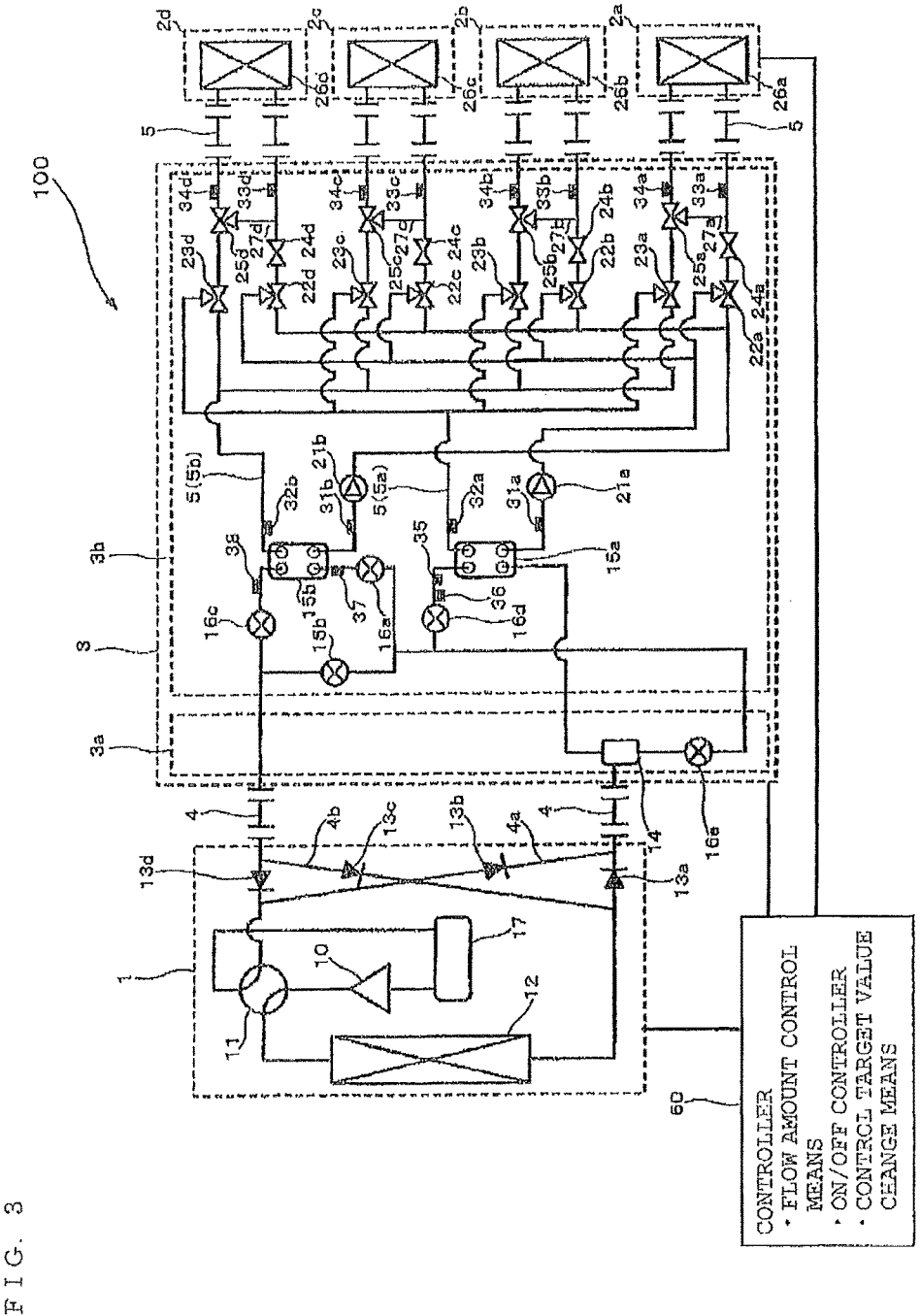
FIG. 3 is a schematic circuit diagram of the configuration of the air-conditioning apparatus.

FIG. 3 is a schematic circuit diagram of the configuration of the air-conditioning apparatus 100. Based on FIG. 3, descriptions will be given to a detailed configuration of the air-conditioning apparatus 100. As shown in FIG. 3, the heat source apparatus 1 and the relay unit 3 are connected via the first intermediate heat exchanger 15a and the second intermediate heat exchanger 15b that are provided with the second relay unit 3b. They are connected with the relay unit 3 and indoor unit 2 as well via the first intermediate heat exchanger 15a and the second intermediate heat exchanger 15b that are provided with the second relay unit 3b. In the following, descriptions will be given to the configuration and function of each constituent apparatus provided with the air-conditioning apparatus 100. In the FIG. 3 and after, a case is shown where the relay unit 3 is divided into the first relay unit 3a and the second relay unit 3b.

Heat Source Apparatus 1

In the heat source apparatus 1, the compressor 10, the four-way valve 11, the heat source side heat exchanger (outdoor heat exchanger) 12, and the accumulator 17 are serially connected by the refrigerant pipeline 4 and accommodated therein. In the heat source apparatus 1, there are provided the first and second connection pipelines 4a and 4b and the stop valves 13a, 13b, 13c, and 13d. By providing the first and second connection pipelines 4a and 4b and the stop valves 13a, 13b, 13c, and 13d, the heat source side refrigerant flow that is made to flow into the relay unit 3 can be directed to a certain direction regardless of the operation required by the indoor unit 2.

The compressor 10 absorbs and compresses the heat source side refrigerant to turn it into a high-temperature high-pressure state, and may be constituted by an inverter compressor or the like capable performing capacity control. The four-way valve 11 switches the heat source side refrigerant flow at the time of heating operation and the heat source side refrigerant flow at the time of cooling operation. The heat source side heat exchanger 12 functions as an evaporator at the time of heating operation, functions as an condenser at the time of cooling operation, exchanges heat between the air supplied by a fan not shown, and the heat source side refrigerant, and turns the heat source side refrigerant into an vaporized gas or a condensed liquid. The accumulator 17 is provided at the suction side of the compressor 10 and stores an excess refrigerant.

The check valve 13d is provided with the refrigerant pipeline 4 between the relay unit 3 and the four-way valve 11 and allows the heat source side refrigerant to flow only in a predetermined direction (the direction from the relay unit 3 to the heat source apparatus 1). The check valve 13a is provided with the refrigerant pipeline 4 between the heat source side heat exchanger 12 and the relay unit 3 and allows the heat source side refrigerant to flow only in a predetermined direction (the direction from the heat source apparatus 1 to the relay unit 3). The check valve 13b is provided with the first connection pipeline 4a to allow the heat source side refrigerant to flow in the direction from the downstream side of the check valve 13d to the downstream side of the check valve 13a. The check valve 13c is provided with the second connection pipeline 4b and allows the heat source side refrigerant to flow in the direction from the upstream side of the check valve 13d to the upstream side of the check valve 13a.

The first connection pipeline 4a connects between the refrigerant pipeline 4 at the downstream side of the check valve 13d and the refrigerant pipeline 4 at the downstream side of the check valve 13a in the heat source apparatus 1. The second connection pipeline 4b connects between the refrigerant pipeline 4 at the upstream side of the check valve 13d and the refrigerant pipeline 4 at the upstream side of the check valve 13a in the heat source apparatus 1. In FIG. 2, although a case where the first and second connection pipelines 4a and 4b and the check valves 13a, 13b, 13c, and 13d are provided as an example, it is not limited thereto and they may not necessarily be provided.

Indoor Unit 2

In the indoor units 2, use side heat exchangers 26 are mounted respectively. The use side heat exchanger 26 is adapted to be connected with the stop valve 24 of the second relay unit 3b and the flow amount adjustment valve 25 via the pipeline 5. The use side heat exchanger 26 exchanges heat between the air supplied by the fan, not shown, and the heat medium and generates a heating air or a cooling air for supplying it to the air-conditioning subject area.

In FIG. 3, a case is shown where four indoor units 2 are connected with the second relay unit 3b and they are illustrated as the indoor units 2a, 2b, 2c, and 2d from under this sheet. Corresponded with the indoor units 2a, 2b, 2c, and 2d, the use side heat exchangers 26 are illustrated as use side heat exchangers 26a, 26b, 26c, and 26d from under this sheet. Additionally, like FIG. 1, the connection number of the indoor unit 2 is not limited to four shown in FIG. 3.

Relay Unit 3

The relay unit 3 is constituted by dividing the housing into the first relay unit 3a and second relay unit 3b. Thereby, as mentioned above, one first relay unit 3a can be connected two or more second relay units 3b. In the first relay unit 3a, a gas-liquid separator 14 and an expansion valve 16e are provided. In the second relay unit 3b, there are provided two intermediate heat exchangers 15, four expansion valves 16, two pumps 21, four flow path switching valves 22, four flow path switching valves 23, four stop valves 24, and four flow amount adjustment valves 25.

The gas-liquid separator 14 is connected with one refrigerant pipeline 4 connecting the heat source apparatus 1 and two refrigerant pipelines 4 connecting the first intermediate heat exchanger 15a and the second intermediate heat exchanger 15b of the second relay unit 3b and divides the heat source side refrigerant supplied by the heat source apparatus 1 into a vapor refrigerant and a liquid refrigerant. The expansion valve 16e is provided between the refrigerant pipeline 4 connecting the expansion valves 16a and 16b and the gas-liquid separator 14 and functions as a decompression valve and a throttle apparatus to decompress and expand the heat source side refrigerant. The expansion valve 16e may be constituted by such as an electronic expansion valve whose opening-degree can be controlled variably.

Two intermediate heat exchangers 15 (the first and the second intermediate heat exchangers 15a and 15b) function as a condenser or an evaporator, exchanges heat between the heat source side refrigerant and the heat medium to supply cooling energy or heating energy generated in the heat source apparatus 1 to the indoor unit 2. In order to flow the heat source side refrigerant, the first intermediate heat exchangers 15a is provided between the gas-liquid separator 14 and the expansion valve 16d to help the heat medium heat. In order to flow the heat source side refrigerant, the second intermediate heat exchangers 15b is provided between the expansion valve 16a and the expansion valve 16c to help the heat medium cool.

The four expansion valves 16 (expansion valves 16a to 16d) function as a decompression valve and a throttle apparatus to decompress and expand the heat source side refrigerant. The expansion valve 16a is provided between the expansion valve 16e and the second intermediate heat exchanger 15b. The expansion valve 16b is provided so as to run parallel to the expansion valve 16a. The expansion valve 16c is provided between the second intermediate heat exchanger 15b and the first relay unit 3a. The expansion valve 16d is provided between the first intermediate heat exchanger 15a and the expansion valves 16a and 16b. The four expansion valves 16 may be constituted by such as an electronic expansion valve whose opening-degree can be controlled variably.

The two pumps 21 (the first pump 21a and the second pump 21b) make the heat medium that flows through the pipeline 5 circulate. The first pump 21a is provided in the pipeline 5 between the first intermediate heat exchanger 15a and the flow path switching valve 22. The second pump 21b is provided in the pipeline 5 between the second intermediate heat exchanger 15b and the flow path switching valve 22. The kind of the first and the second pumps 21a and 21b are not limited in particular. They may be constituted by such as a pump capable of controlling capacity.

The four flow path switching valves 22 (the flow path switching valves 22a to 22d) are constituted by a three-way valve to switch the heat medium flow path. The number of the flow path switching valve 22 is adapted to correspond to the number of installed indoor units 2 (it is four, here). In the flow path switching valve 22, each of the three valves is connected with the first intermediate heat exchanger 15a, the second intermediate heat exchanger 15b, and the stop valve 24, respectively, and being provided at the inlet side of the heat medium flow path in the use side heat exchanger 26. In order to make them corresponded with the indoor unit 2, the flow path switching valves 22a, 22b, 22c, and 22d are illustrated from the downside of this sheet.

The four flow path switching valves 23 (the flow path switching valves 23a to 23d) are constituted by a three-way valve to switch the heat medium flow path. The number of the flow path switching valve 23 is adapted to correspond to the number of installed indoor units 2 (it is four, here). In the flow path switching valve 23, each of the three valves is connected with the first intermediate heat exchanger 15a, the second intermediate heat exchanger 15b, and the flow amount adjustment valve 25, respectively, and being provided at the outlet side of the heat medium flow path in the use side heat exchanger 26. In order to make them correspond with the indoor unit 2, the flow path switching valves 23a, 23b, 23c, and 23d are illustrated from the downside of this sheet.

The four stop valves (the stop valves 24a to 24d) are constituted by a two-way valve to open/close the pipeline 5. The number of the stop valve 24 is adapted to correspond to the number of installed indoor units 2 (it is four, here). The stop valve 24 is connected with the use side heat exchanger 26 on one side and with the flow path switching valve 22 on the other side respectively, and provided at the inlet side of the heat medium flow path of the use side heat exchanger 26. In order to make them correspond with the indoor unit 2, the stop valves 24a, 24b, 24c, and 24d are illustrated from the downside of this sheet.

The four flow amount adjustment valves 25 (the flow amount adjustment valves 25a to 25d) are constituted by a three-way valve to switch the heat medium flow path. The number of the flow amount adjustment valve 25 is adapted to correspond to the number of installed indoor units 2 (it is four, here). In the flow amount adjustment valve 25, each of the three valves is connected with the use side heat exchanger 26, the bypass 27, and the flow path switching valve 23, respectively, and being provided at the outlet side of the heat medium flow path in the use side heat exchanger 26. In order to make them correspond with the indoor unit 2, the flow amount adjustment valves 22a, 22b, 22c, and 22d are illustrated from the downside of this sheet.

The bypass 27 is provided so as to connect the pipeline 5 between the stop valve 24 and the use side heat exchanger 26 to the flow amount adjustment valve 25. The number of the bypass 27 is adapted to correspond to the number of installed indoor units 2 (it is four here, that is, bypasses 27a, 27b, 27c, and 27d). In order to make them correspond with the indoor unit 2, the bypasses 27a, 27b, 27c, and 27d are illustrated from the downside of this sheet.

In the second relay unit 3b, there are provided two first temperature sensors 31, two second temperature sensors 32, four third temperature sensors 34, four fourth temperature sensors, a fifth temperature sensor 35, a pressure sensor 36, a sixth temperature sensor 37, and a seventh temperature sensor 38. Information detected by these detection means is sent to the controller (controller 60) that controls the operation of the air-conditioning apparatus 100 to be utilized for the control of the drive frequency of the pump 21, the switching of the heat medium flow path flowing through the pipeline 5 and the like.

The two first temperature sensors 31 (the first temperature sensors 31a and 31b) detect the temperature of the heat medium flowed out from the intermediate heat exchanger 15, that is, the temperature of the heat medium at the outlet of the intermediate heat exchanger 15 and may be constituted by a thermistor and the like, for example. The first temperature sensor 31a is provided in the pipeline 5 at the inlet side of the first pump 21a. The first temperature sensor 31b is provided in the pipeline 5 at the inlet side of the second pump 21b.

The two second temperature sensors 32 (the second temperature sensors 32a and 32b) detect the temperature of the heat medium flowed into the intermediate heat exchanger 15, that is, the temperature of the heat medium at the inlet of the intermediate heat exchanger 15 and may be constituted by a thermistor and the like, for example. The second temperature sensor 32a is provided in the pipeline 5 at the inlet side of the intermediate heat exchanger 15a. The second temperature sensor 32b is provided in the pipeline 5 at the inlet side of the second intermediate heat exchanger 15b.

The four third temperature sensors 33 (the third temperature sensors 33a to 33d) are provided at the inlet side of the heat medium flow path of the use side heat exchanger 26 to detect the temperature of the heat medium flowing into the use side heat exchanger 26 and may be constituted by a thermistor and the like. The number of the third temperature sensors 33 is adapted to correspond to the number of installed indoor units 2 (it is four, here). In order to make them correspond with the indoor unit 2, the third temperature sensors 33a, 33b, 33c, and 33d are illustrated from the downside of this sheet.

The four fourth temperature sensors 34 (the fourth temperature sensors 34a to 34d) are provided at the outlet side of the heat medium flow path of the use side heat exchanger 26 to detect the temperature of the heat medium flowing out from the use side heat exchanger 26 and may be constituted by a thermistor and the like. The number of the fourth temperature sensors 34 is adapted to correspond to the number of installed indoor units 2 (it is four, here). In order to make the corresponded with the indoor unit 2, the fourth temperature sensors 34a, 34b, 34c, and 34d are illustrated from the downside of this sheet.

The fifth temperature sensor 35 is provided at the outlet side of the heat source side refrigerant flow path of the first intermediate heat exchanger 15a to detect the temperature of the heat source side refrigerant flowing out from the first intermediate heat exchanger 15a and may be constituted by a thermistor and the like. The pressure sensor 36 is provided at the outlet side of the heat source side refrigerant flow path of the first intermediate heat exchanger 15a to detect the pressure of the heat source side refrigerant flowing out from the first intermediate heat exchanger 15a and may be constituted by a pressure sensor and the like.

The sixth temperature sensor 37 is provided at the inlet side of the heat source side refrigerant flow path of the second intermediate heat exchanger 15b to detect the temperature of the heat source side refrigerant flowing into the second intermediate heat exchanger 15b and may be constituted by a thermistor and the like. The seventh temperature sensor 38 is provided at the outlet side of the heat source side refrigerant flow path of the second intermediate heat exchanger 15b to detect the temperature of the heat source side refrigerant flowing out from the second intermediate heat exchanger 15b and may be constituted by a thermistor and the like.

The pipeline 5 that makes the heat medium flow through is constituted by the pipeline connected with the first intermediate heat exchanger 15a (hereinafter, referred to as pipeline 5a) and the pipeline connected with the second intermediate heat exchanger 15b (hereinafter, referred to as pipeline 5b). The pipelines 5a and 5b are branched according to the number of the indoor units 2 connected with the relay unit 3 (here, 4 branches each). The pipelines 5a and 5b are connected by the flow path switching valve 22, and the flow path switching valve 23. By controlling the flow path switching valve 22 and the flow path switching valve 23, it is adapted to be determined whether the heat medium throwing through the pipeline 5a is made to flow into the use side heat exchanger 26 or the heat medium flowing through the pipeline 5b is made to flow into the use side heat exchanger 26.

In the air-conditioning apparatus 100, a controller 60 is provided that controls the operation of each apparatus mounted in the heat source apparatus 1, the relay unit 3, and the indoor unit 2 based on information from a remote controller for receiving instructions from each detection means and users. The controller 60 is adapted to control the driving frequency of the compressor 10 mounted on the heat source apparatus 1, the rotation speed (including ON/OFF) of a fan installed in the vicinity of the heat source side heat exchanger 12, switching of the four-way valve 11 or the like, and to execute each operation mode to be mentioned later. Further, the controller 60 is adapted to control the rotation speed (including ON/OFF) of a fan installed in the vicinity of the use side heat exchanger 26.

Moreover, the controller 60 is adapted to control the drive of the pump 21 mounted on the relay unit 3, the opening-degree of the expansion valves 16a to 16d, switching of the flow path switching valve 22 and flow path switching valve 23, the opening and closing of the stop valve 24, and switching of the flow amount adjustment valve 25. That is, the controller 60 has a function as flow amount control means that adjusts the heat medium flow amount in the relay unit 3, flow path decision means that decides the flow path of the heat medium, ON/OFF control means that executes ON/OFF of each apparatus, and control target value change means that appropriately changes the set target value based on information from each detection means. The controller may be provided in each unit. In that case, each controller may be set to be communicable with each other. The control unit is constituted by a micro processor and the like.

In the air-conditioning apparatus 100, a refrigeration cycle is constituted by connecting the refrigerant flow path of the compressor 10, four-way valve 11, heat source side heat exchanger 12, and first intermediate heat exchanger 15a, the refrigerant flow path of the second intermediate heat exchanger 15b, and the accumulator 17 by the refrigerant pipeline 4 through which the refrigerant circulates. The heat medium circulation circuit is constituted by connecting the heat medium flow path of the first intermediate heat exchanger 15a, first pump 21a, and use side heat exchanger 26 in order by the pipeline 5a through which the heat medium is made to circulate. In the same way, the heat medium circulation circuit is constituted by connecting the heat medium flow path of the second intermediate heat exchanger 15b, second pump 21b, and use side heat exchanger 26 in order by the pipeline 5b through which the heat medium is made to circulate. That is, each intermediate heat exchanger 15 is connected with two or more use side heat exchangers 26 in parallel and the heat medium circulation circuit is made to have two or more systems.

That is, in the air-conditioning apparatus 100, the heat source apparatus 1 and the relay unit 3 are connected via the first intermediate heat exchanger 15a and the second intermediate heat exchanger 15b provided in the relay unit 3, and the relay unit 3 and the indoor unit 2 are connected by the first intermediate heat exchanger 15a and the second intermediate heat exchanger 15b. In the first intermediate heat exchanger 15a and the second intermediate heat exchanger 15b, the heat source side refrigerant that is a primary side heat medium circulating in the refrigeration cycle and the heat medium that is a secondary side refrigerant circulating the heat medium circulation circuit are adapted to exchanges heat.

Now, descriptions will be given to kinds of the refrigerant used in the refrigeration cycle and the heat medium circulation circuit. In the refrigeration cycle, non-azeotropic mixture refrigerant such as R407C, pseudo-azeotropic mixture refrigerant such as R410A and R404A, or single refrigerant such as R22 and R134a can be used. A natural refrigerant such as carbon dioxide and hydrocarbon can be used as well. By using the natural refrigerant as the heat source side refrigerant, an effect is available to suppress greenhouse effect of the earth due to refrigerant leakage. In particular, since carbon dioxide performs heat exchange with no condensation at the high-pressure side under a supercritical condition, when the heat source side refrigerant and the heat medium is made to be a counter flow form in the first intermediate heat exchanger 15a second intermediate heat exchanger 15b as shown in FIG. 2, heat exchange performance can be improved at the time of heating or cooling the heat medium.

The heat medium circulation circuit is connected with the use side heat exchanger 26 of the indoor unit2 as mentioned above. Accordingly, a high-security heat medium is assumed to be used in the air-conditioning apparatus 100, considering a case where the heat medium leaks into the room where the indoor unit 2 is installed. Therefore, water, an antifreezing liquid, and a water-antifreezing-liquid-mixture or the like can be used for the heat medium. According to this configuration, even if the refrigerant leaks from the pipeline, the leaked refrigerant can be prevented from entering indoors, enabling to achieve high reliability. When the indoor unit 2 is installed at a place hating water such as a computer room, highly thermally insulative fluorinated inert fluid may be used as the heat medium.

Here, descriptions will be given to each operation mode that the air-conditioning apparatus 100 executes.

The air-conditioning apparatus 100 can perform cooling operation or heating operation in the indoor unit 2 based on instructions from each indoor unit 2 itself. That is, in the air-conditioning apparatus 100, not only all the indoor units 2 can perform the same operation, but also each indoor unit 2 can perform different operation respectively. In the following, four operation modes that the air-conditioning apparatus 100 performs will be explained along with the refrigerant flow: cooling only operation mode in which all indoor units 2 in operation perform cooling operation; heating only operation in which all indoor units 2 in operation perform heating operation; cooling-main operation in which the cooling load dominates; and heating-main operation in which the heating load dominates.

Cooling Only Operation Mode

Figure 4:
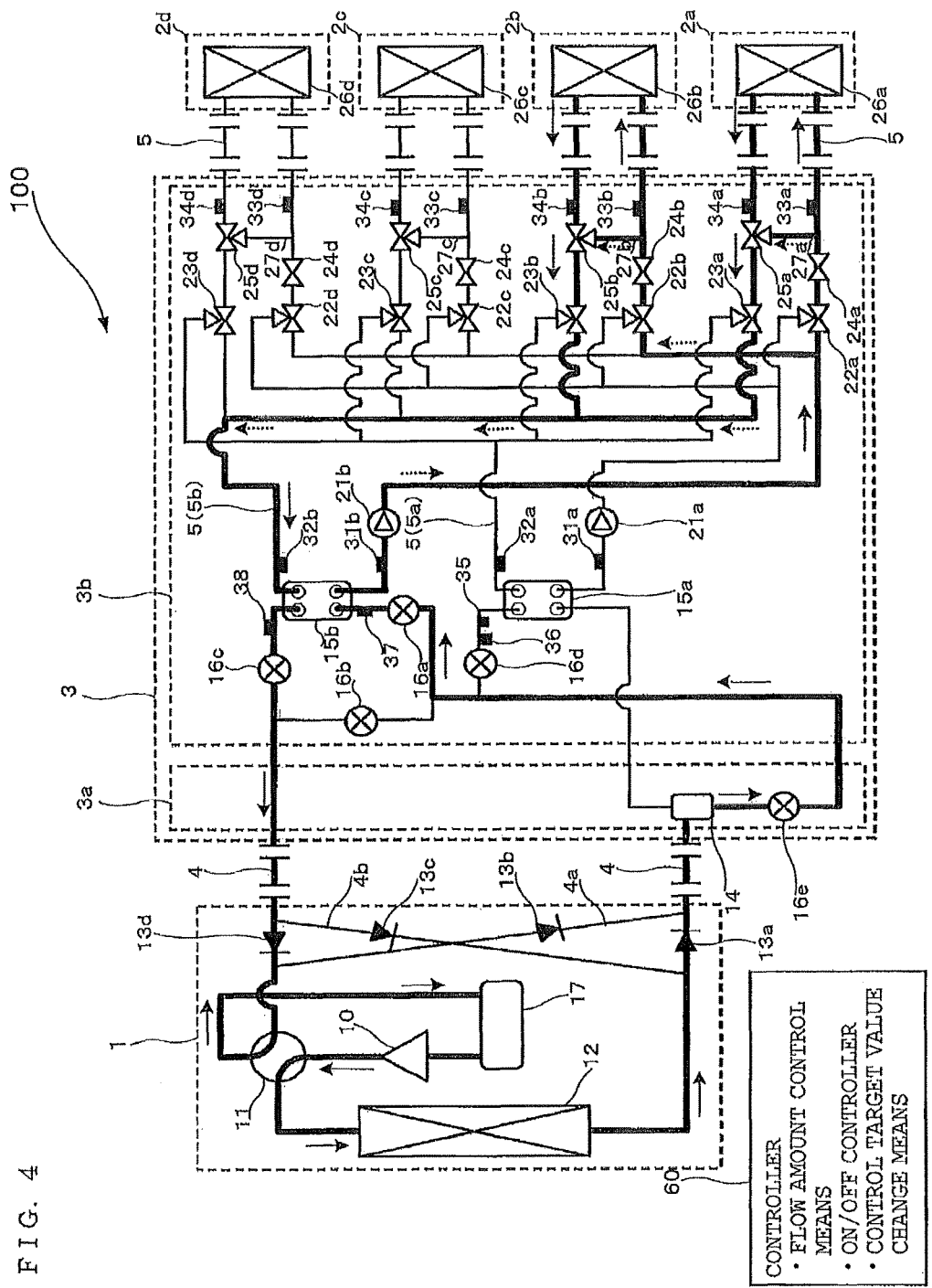
FIG. 4 is a refrigerant circuit diagram showing a refrigerant flow at the time of an cooling only operation mode of the air-conditioning apparatus.

FIG. 4 is a refrigerant circuit diagram showing a refrigerant flow in the cooling only operation mode of the air-conditioning apparatus. In FIG. 4, cooling only operation mode will be explained by an example in which cooling load is generated only in the use side heat exchangers 26a and 26b. That is, in FIG. 4 shows a case in which no cooling load is generated in the use side heat exchangers 26c and 26d. In FIG. 4, the pipeline denoted by a thick line shows the pipeline through which the refrigerant (heat source side refrigerant and heat medium) circulates. A heat source side refrigerant flow direction is denoted by a solid line arrow and a heat medium flow direction by a dotted line arrow, respectively.

In the case of cooling only operation mode shown in FIG. 4, in the heat source apparatus 1, the four-way valve 11 is switched so as to make the heat source side refrigerant discharged from the compressor 10 flow into the heat source side heat exchanger 12. In the relay unit 3, the first pump 21a is stopped, the second pump 21b is driven, the stop valves 24a and 24b are made open, the stop valves 24c and 24d are closed, and the heat medium is made to circulate between the second intermediate heat exchanger 15b and each use side heat exchanger 26 (the use side heat exchangers 26a and 26b). Under these conditions, the compressor 10 starts operation.

Firstly, the heat source side refrigerant flow in the refrigeration cycle will be explained.

A low-temperature low-pressure refrigerant is compressed by the compressor 10 and turned into a high-temperature high-pressure gas refrigerant to be discharged. The high-temperature high-pressure gas refrigerant discharged from the compressor 10 passes through the four-way valve 11 to flow into the heat source side heat exchanger 12. Then, it is condensed and liquefied while releasing heat into the open air in the heat source side heat exchanger 12 to turn into a high-pressure liquid refrigerant. The high-pressure liquid refrigerant flowed out from the heat source side heat exchanger 12 passes through the check valve 13a, flows out of the heat source apparatus 1, passes through the refrigerant pipeline 4 to flow into the first relay unit 3a. The high-pressure liquid refrigerant flowed into the first relay unit 3a flows into the second relay unit 3b via the expansion valve 16e after flowing into the gas-liquid separator 14.

The refrigerant flowing into the second relay unit 3b is throttled by the expansion valve 16a and expanded to turn into a low-temperature low-pressure gas-liquid two-phase refrigerant. The gas-liquid two-phase refrigerant flows into the second intermediate heat exchanger 15b that acts as an evaporator to turn into a low-temperature low-pressure gas refrigerant while cooling the heat medium by absorbing heat from the heat medium circulating in the heat medium circulation circuit. The gas refrigerant flowing out from the second intermediate heat exchanger 15b flows out from the second relay unit 3b and the first relay unit 3a after passing through the expansion valve 16c to flow into the heat source apparatus 1 via the refrigerant pipeline 4. The refrigerant that flowed into the heat source apparatus 1 flows through the check valve 13d to be sucked again into the compressor 10 via the four-way valve 11 and the accumulator 17. The expansion valves 16b and 16d are adapted to have a small opening-degree such that no refrigerant flows and the expansion valve 16c is made to be full-open so as not to occur pressure loss.

Next, heat medium flow in the heat medium circulation circuit will be explained.

In the cooling only operation mode, since the first pump 21a is stopped, the heat medium circulates via the pipeline 5b. The heat medium cooled by the heat source side refrigerant in the second intermediate heat exchanger 15b flows in the pipeline 5b by the second pump 21b. The heat medium having pressurized in and flowed out from the second pump 21b passes through the stop valve 24 (stop valves 24a and 24b) via the flow path switching valve 22 (flow path switching valves 22a and 22b) to flow into the use side heat exchanger 26 (use side heat exchangers 26a and 26b). Then, the heat medium absorbs heat from the indoor air in the use side heat exchanger 26 to perform cooling of the air-conditioning subject area such as an inside of a room where the indoor unit 2 is installed.

Thereafter, the heat medium flowed out from the use side heat exchanger 26 flows into the flow amount adjustment valve 25 (flow amount adjustment valves 25a and 25b). Thereby, through the operation of the flow amount adjustment valve 25, only the heat medium necessary to cover the air-conditioning load required in the air-conditioning subject area such as an inside of a room flows into the use side heat exchanger 26 and the remaining heat medium flows through the bypass 27 (bypasses 27a and 27b) so as to bypass the use side heat exchanger 26.

The heat medium passing through the bypass 27 does not contribute to heat exchange, merges with the heat medium that has passed through the use side heat exchanger 26, passes through the flow path switching valve 23 (flow path switching valves 23a and 23b), and flows into the second intermediate heat exchanger 15b to be sucked into the second pump 21b again. The air-conditioning load required by the air-conditioning subject area such as an inside of a room can be covered by controlling the temperature difference between the third temperature sensor 33 and the fourth temperature sensor 34 to keep a target value.

Thereby, since there is no need to flow the heat medium to the use side heat exchanger 26 (including thermo-off) having no air-conditioning load, the flow path is closed by the stop valve 24 and the heat medium is prevented from flowing into the use side heat exchanger 26. In FIG. 4, while the heat medium is made to flow because in the use side heat exchangers 26a and 26b there is the air-conditioning load, there is no air-conditioning load in the use side heat exchangers 26c and 26d and the corresponding stop valves 24c and 24d are made to be a closed state. When a cooling load is generated from the use side heat exchangers 26c or 26d, the stop valve 24c or 24d may be opened and the heat medium is made to circulate.

Heating Only Operation Mode

Figure 5:
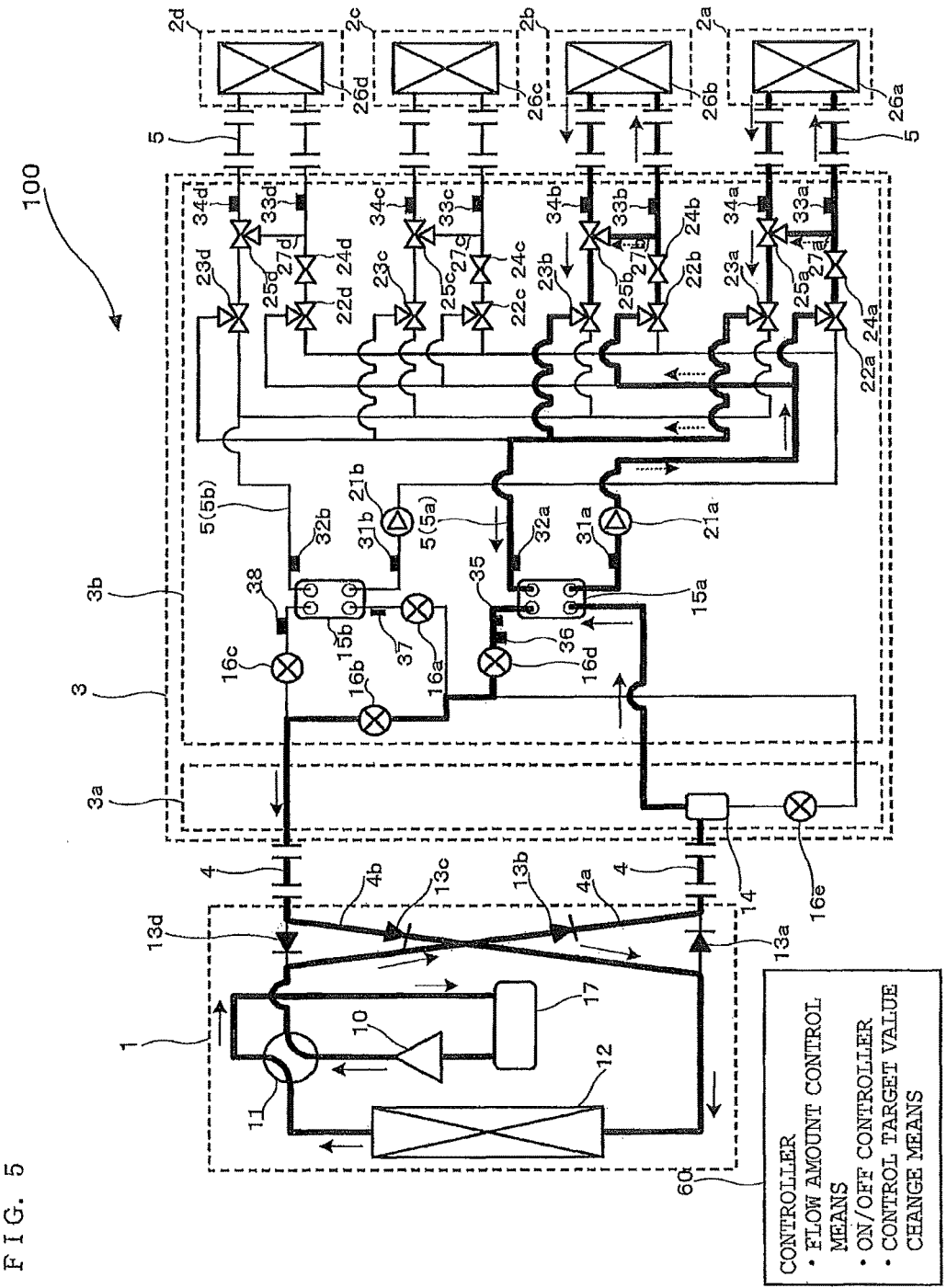
FIG. 5 is a refrigerant circuit diagram showing a refrigerant flow at the time of an heating only operation mode of the air-conditioning apparatus.

FIG. 5 is a refrigerant circuit diagram showing a refrigerant flow at the time of the heating only operation mode of the air-conditioning apparatus 100. In FIG. 5, heating only operation mode will be explained by a case where a heating load is generated only in the use side heat exchangers 26a and 26b as an example. That is, FIG. 5 shows a case where no heating load is generated in the use side heat exchangers 26c and 26d. In FIG. 5, the pipeline denoted by a thick line shows the pipeline through which the refrigerant (heat source side refrigerant and heat medium) circulates. A heat source side refrigerant flow direction is denoted by a solid line arrow and a heat medium flow direction by a dotted line arrow, respectively.

In the case of the heating only operation mode shown in FIG. 5, in the heat source apparatus 1, the four-way valve 11 is switched so as to make the heat source side refrigerant discharged from the compressor 10 flow into the relay unit 3 without via the heat source side heat exchanger 12. In the relay unit 3, the first pump 21a is driven, the second pump 21b is stopped, the stop valves 24a and 24b are made open, the stop valves 24c and 24d are closed so as to make the heat medium circulate between the first intermediate heat exchanger 15a and each use side heat exchanger 26 (the use side heat exchangers 26a and 26b). Under these conditions, the compressor 10 starts operation.

Firstly, the heat source side refrigerant flow in the refrigeration cycle will be explained.

A low-temperature low-pressure refrigerant is compressed by the compressor 10 and turned into a high-temperature high-pressure gas refrigerant to be discharged. The high-temperature high-pressure gas refrigerant discharged from the compressor 10 passes through the four-way valve 11, flows through the first connection pipeline 4a, passes through the check valve 13b to flow out from the heat source apparatus 1. The high-temperature high-pressure gas refrigerant flowed out from the heat source apparatus 1 passes through the refrigerant pipeline 4 to flow into the first relay unit 3a. The high-temperature high-pressure gas refrigerant flowed into the first relay unit 3a flows into the first intermediate heat exchanger 15a after flowing into the gas-liquid separator 14. The high-temperature high-pressure gas refrigerant flowed into the first intermediate heat exchanger 15a is condensed and liquefied to turn into a high-pressure liquid refrigerant while releasing heat to the heat medium circulating in the heat medium circulation circuit.

The liquid refrigerant flowing out from the first intermediate heat exchanger 15a is throttled by the expansion valve 16d and expanded to turn into a low-temperature low-pressure gas-liquid two-phase state. The gas-liquid two-phase state refrigerant throttled by the expansion valve 16d passes through the expansion valve 16b and flows through the refrigerant pipeline 4 to flow into the heat source apparatus 1 again. The refrigerant flowed into the heat source apparatus 1 passes through the second connection pipeline 4b via the check valve 13c to flow into the heat source side heat exchanger 12 that operates as an evaporator. Then, the refrigerant flowed into the heat source side heat exchanger 12 absorbs heat from the open air thereinto turn into a low-temperature low-pressure gas refrigerant. The low-temperature low-pressure gas refrigerant flowed out from the heat source side heat exchanger 12 returns to the compressor 10 via the four-way valve 11 and the accumulator 17. The expansion valves 16a, 16c, and 16d are made to have a small opening-degree such that no refrigerant flows.

Next, descriptions will be given to the heat medium flow in the heat medium circulation circuit.

In the heating only operation mode, since the second pump 21b is stopped, the heat medium circulates via the pipeline 5a. The heat medium heated by the heat source side refrigerant in the first intermediate heat exchanger 15a flows in the pipeline 5a by the first pump 21a. The heat medium that is pressurized by the first pump 21a and flowed out passes through the stop valve 24 (stop valves 24a and 24b) via the flow path switching valve 22 (flow path switching valves 22a and 22b) to flow into the use side heat exchanger 26 (use side heat exchangers 26a and 26b). Then, the heat medium releases heat to the indoor air in the use side heat exchanger 26 to perform heating of the air-conditioning subject area of the inside of a room and the like where the indoor unit 2 is installed.

Thereafter, the heat medium flowed out from the use side heat exchanger 26 flows into the flow amount adjustment valve 25 (flow amount adjustment valves 25a and 25b). Then, through the operation of the flow amount adjustment valve 25, only the heat medium necessary to cover the air-conditioning load required in the air-conditioning subject area such as an inside of a room flows into the use side heat exchanger 26 and the remaining heat medium flows through the bypass 27 (bypasses 27a and 27b) so as to bypass the use side heat exchanger 26.

The heat medium passing through the bypass 27 does not contribute to heat exchange, merges with the heat medium that has passed via the use side heat exchanger 26, passes through the flow path switching valve 23 (flow path switching valves 23a and 23b), and flows into the first intermediate heat exchanger 15a to be sucked into the first pump 21a again. The air-conditioning load required in the air-conditioning subject area such as an inside of a room can be covered by controlling the temperature difference between the third temperature sensor 33 and the fourth temperature sensor 34 to keep a target value.

Thereby, since there is no need to flow the heat medium to the use side heat exchanger 26 (including thermo-off) having no air-conditioning load, the flow path is closed by the stop valve 24 and the heat medium is prevented from flowing into the use side heat exchanger 26. In FIG. 5, while the heat medium is made to flow because in the use side heat exchangers 26a and 26b there is the air-conditioning load, there is no air-conditioning load in the use side heat exchangers 26c and 26d and the corresponding stop valves 24c and 24d are made to be a closed state. When a cooling load is generated from the use side heat exchanger 26c or 26d, the stop valve 24c or 24d may be opened and the heat medium is made to circulate.

Cooling-main Operation Mode

Figure 6:
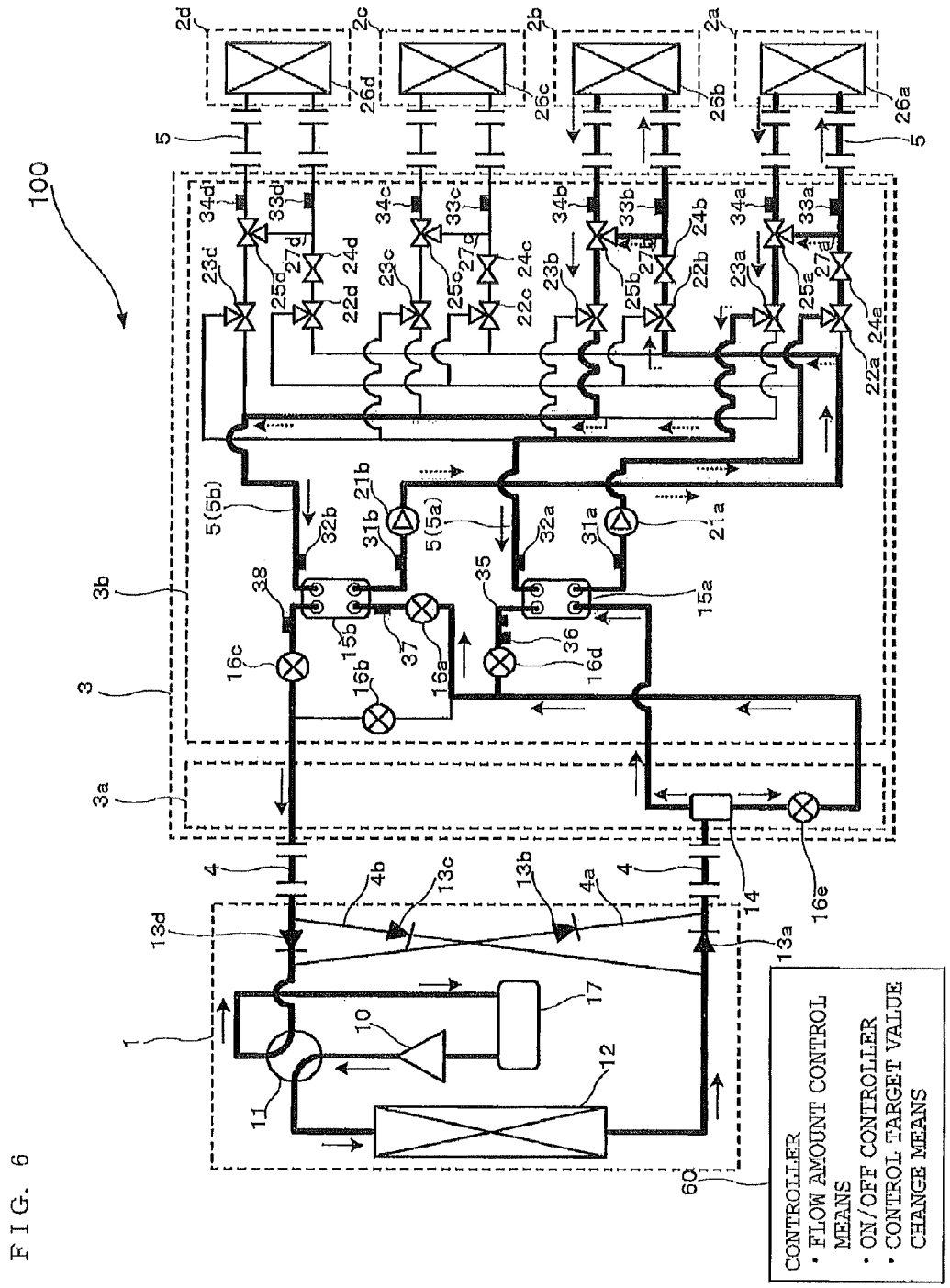
FIG. 6 is a refrigerant circuit diagram showing a refrigerant flow at the time of a cooling-main operation mode of the air-conditioning apparatus.

FIG. 6 is a refrigerant circuit diagram showing a refrigerant flow at the time of the cooling-main operation mode of the air-conditioning apparatus 100. In FIG. 6, the cooling-main operation mode will be explained by a case where a heating load is generated in the use side heat exchangers 26a and a cooling load is generated in the use side heat exchangers 26b, as an example. That is, FIG. 6 illustrates a case where neither heating load nor cooling load is generated in the use side heat exchangers 26c and 26d. In FIG. 6, the pipeline denoted by a thick line shows the pipeline through which the refrigerant (heat source side refrigerant and heat medium) circulates. A heat source side refrigerant flow direction is denoted by a solid line arrow and a heat medium flow direction by a dotted line arrow, respectively.

In the case of the cooling-main operation mode shown in FIG. 6, in the heat source apparatus 1, the four-way valve 11 is switched so as to make the heat source side refrigerant discharged from the compressor 10 flow into the heat source side heat exchanger 12. In the relay unit 3, the first pump 21a and the second pump 21b are driven, the stop valves 24a and 24b are made open, the stop valves 24c and 24d are closed so as to make the refrigerant circulate between the first intermediate heat exchanger 15a and the use side heat exchanger 26a and between the second intermediate heat exchanger 15b and the use side heat exchanger 26b. Under these conditions, the compressor 10 starts operation.

Firstly, the heat source side refrigerant flow in the refrigeration cycle will be explained.

A low-temperature low-pressure refrigerant is compressed by the compressor 10 and turned into a high-temperature high-pressure gas refrigerant to be discharged. The high-temperature high-pressure gas refrigerant discharged from the compressor 10 passes through the four-way valve 11 to flow into the heat source side heat exchanger 12. Then, the gas refrigerant condenses while releasing heat into the outdoor air in the heat source side heat exchanger 12 to turn into a gas-liquid two-phase refrigerant. The gas-liquid two-phase refrigerant flowed out from the heat source side heat exchanger 12 passes through the check valve 13a, flows out from the heat source apparatus 1, flows through the refrigerant pipeline 4 to flow into the first relay unit 3a. The gas-liquid two-phase refrigerant flowed into the first relay unit 3a flows into the gas-liquid separator 14, being separated into a gas refrigerant and a liquid refrigerant to flow into the second relay unit 3b.

The gas refrigerant separated by the gas-liquid separator 14 flows into the first intermediate heat exchanger 15a. The gas refrigerant flowed into the first intermediate heat exchanger 15a is condensed and liquefied while releasing heat to the heat medium circulating in the heat medium circulation circuit to turn into a liquid refrigerant. The liquid refrigerant having flowed out from the first intermediate heat exchanger 15a passes through the expansion valve 16d. On the other hand, the liquid refrigerant separated by the gas-liquid separator 14 flows into the expansion valve 16e, and merges with the liquid refrigerant passed through the expansion valve 16d after being condensed and liquefied in the first intermediate heat exchanger 15a. Then, the refrigerant is throttled by the expansion valve 16a to expand, and turns into a low-temperature low-pressure gas-liquid two-phase refrigerant to flow into the second intermediate heat exchanger 15b.

By absorbing heat from the heat medium circulating in the heat medium circulation circuit in the second intermediate heat exchanger 15b acting as an evaporator, the gas-liquid two-phase refrigerant turns into a low-temperature low-pressure gas refrigerant while cooling the heat medium. The gas refrigerant flowed out from the second intermediate heat exchanger 15b flows out from the second relay unit 3b and first relay unit 3a after passing via the expansion valve 16c, passes through the refrigerant pipeline 4 to flow into the heat source apparatus 1. The refrigerant having flowed into the heat source apparatus 1 flows through the check valve 13d to be sucked into the compressor 10 again via the four-way valve 11 and the accumulator 17. The expansion valve 16b is adapted to have a small opening-degree such that no refrigerant flows. The expansion valve 16c is made to be a full open state so as not to occur pressure losses.

Next, descriptions will be given to the heat medium flow in the heat medium circulation circuit.

In the cooling-main operation mode, since the both first and second pumps 21a and 21b are driven, the heat medium circulates via the both pipelines 5a and 5b. The heat medium heated by the heat source side refrigerant in the first intermediate heat exchanger 15a flows through the pipeline 5a by the first pump 21a. The heat medium cooled by the heat source side refrigerant in the second intermediate heat exchanger 15b flows through the pipeline 5b by the second pump 21b.

The heat medium having pressurized and flowed out from the first mump 21a passes through the stop valve 24a via the flow path switching valve 22a to flow into the use side heat exchanger 26a. Then, the heat medium releases heat to the indoor air in the use side heat exchanger 26a to heat the air-conditioning subject area such as an inside of a room where the indoor unit 2 is installed. The heat medium having pressurized and flowed out from the second mump 21b passes through the stop valve 24b via the flow path switching valve 22b to flow into the use side heat exchanger 26b. Then, the heat medium absorbs heat from the indoor air in the use side heat exchanger 26b to cool the air-conditioning subject area such as an inside of a room where the indoor unit 2 is installed.

The heat medium having performed heating flows into the flow amount adjustment valve 25a. Then, through the operation of the flow amount adjustment valve 25a, only the heat medium necessary to cover the air-conditioning load required in the air-conditioning subject area flows into the use side heat exchanger 26a and the remaining flows through the bypass 27a so as to bypass the use side heat exchanger 26a. The heat medium passing through the bypass 27a does not contribute to heat exchange but merges with the heat medium having passed via the use side heat exchanger 26a, passes through the flow path switching valve 23a, flows into the first intermediate heat exchanger 15a to be sucked by the first pump 21a again.

Likewise, the heat medium having performed cooling flows into the flow amount adjustment valve 25b. Then, through the operation of the flow amount adjustment valve 25b, only the heat medium necessary to cover the air-conditioning load required in the air-conditioning subject area flows into the use side heat exchanger 26b and the remaining flows through the bypass 27b so as to bypass the use side heat exchanger 26b. The heat medium passing through the bypass 27b does not contribute to heat exchange but merges with the heat medium having passed via the use side heat exchanger 26b, passes through the flow path switching valve 23b, and flows into the second intermediate heat exchanger 15b to be sucked by the second pump 21b again.

Meanwhile, a warm heat medium (the heat medium used for a heating load) and a cold heat medium (the heat medium used for a cooling load) are made to flow into the use side heat exchanger 26a having the heating load and the use side heat exchanger 26b having the cooling load without being mixed through the operation of the flow path switching valve 22 (the flow path switching valves 22a and 22b) and the flow path switching valve 23 (the flow path switching valves 23a and 23b). The air-conditioning load required by the air-conditioning subject area such as an inside of a room can be covered by controlling the temperature difference between the third temperature sensor 33 and the fourth temperature sensor 34 to keep a target value.

Thereby, since there is no need to flow the heat medium to the use side heat exchanger 26 (including thermo-off) having no air-conditioning load, the flow path is closed by the stop valve 24 and the heat medium is prevented from flowing into the use side heat exchanger 26. In FIG. 6, while the heat medium is made to flow because in the use side heat exchangers 26a and 26b there is the air-conditioning load, there is no air-conditioning load in the use side heat exchangers 26c and 26d and the corresponding stop valves 24c and 24d are made to be a closed state. When a heating load or a cooling load is generated from the use side heat exchanger 26c or 26d, the stop valve 24c or 24d may be opened and the heat medium is made to circulate.

Heating-main Operation Mode

Figure 7:
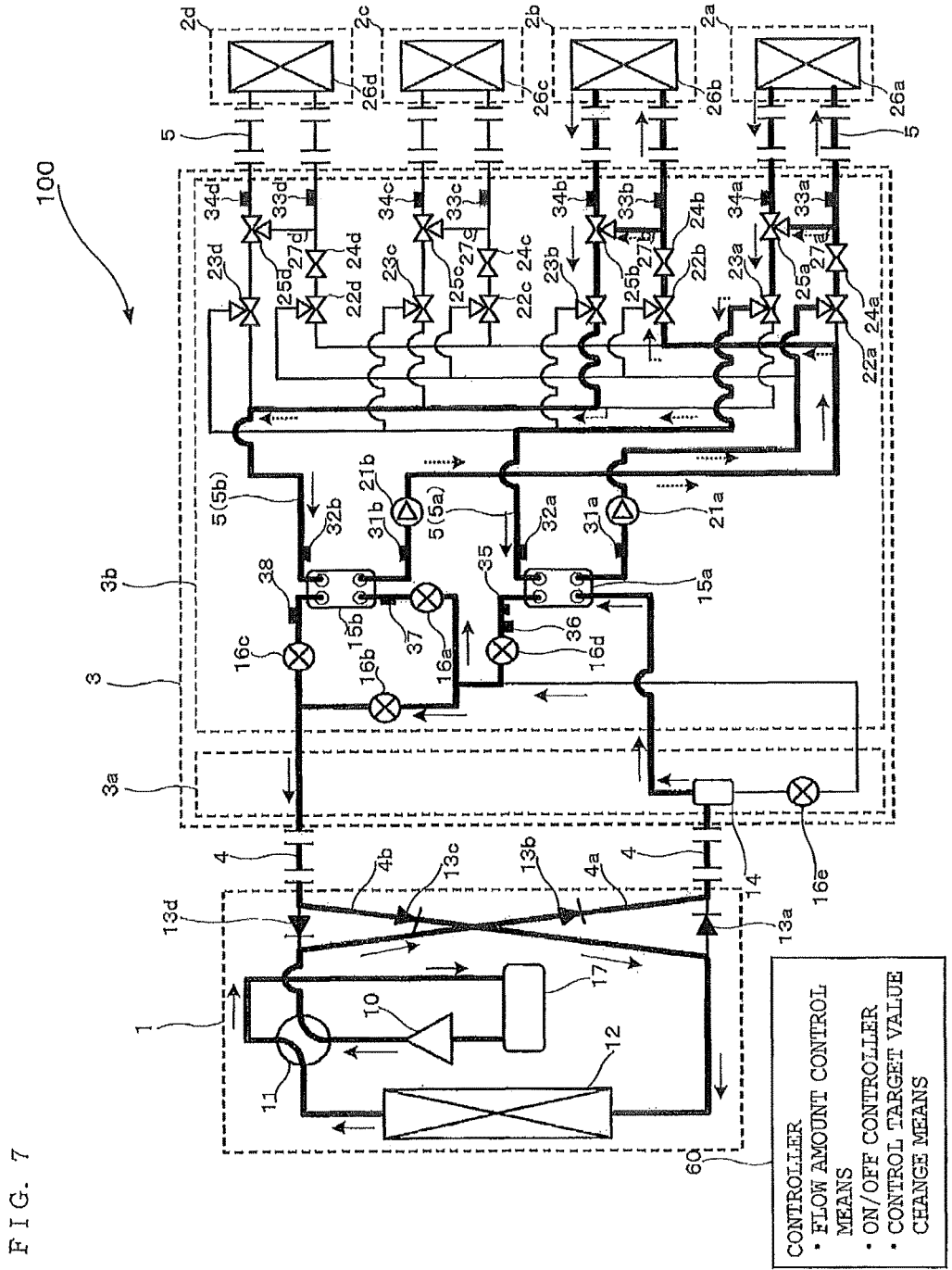
FIG. 7 is a refrigerant circuit diagram showing a refrigerant flow at the time of a heating-main operation mode of the air-conditioning apparatus.

FIG. 7 is a refrigerant circuit diagram showing a refrigerant flow at the time of the heating-main operation mode of the air-conditioning apparatus 100. In FIG. 7, the heating-main operation mode will be explained by a case where a heating load is generated in the use side heat exchangers 26a and a cooling load is generated in the use side heat exchangers 26b, as an example. That is, FIG. 7 illustrates a case where neither heating load nor cooling load are generated in the use side heat exchangers 26c and 26d. In FIG. 7, the pipeline denoted by a thick line shows the pipeline through which the refrigerant (heat source side refrigerant and heat medium) circulates. A heat source side refrigerant flow direction is denoted by a solid line arrow and a heat medium flow direction by a dotted line arrow, respectively.

In the case of the heating-main operation mode shown in FIG. 7, in the heat source apparatus 1, the four-way valve 11 is switched so as to make the heat source side refrigerant discharged from the compressor 10 flow into the relay unit 3 without via the heat source side heat exchanger 12. In the relay unit 3, the first pump 21a and the second pump 21b are driven, the stop valves 24a and 24b are made open, the stop valves 24c and 24d are closed so as to make the heat medium circulate between the first intermediate heat exchanger 15a and the use side heat exchanger 26a and between the second intermediate heat exchanger 15b and the use side heat exchanger 26b. Under these conditions, the compressor 10 starts operation.

Firstly, the heat source side refrigerant flow in the refrigeration cycle will be explained.

A low-temperature low-pressure refrigerant is compressed by the compressor 10 and turned into a high-temperature high-pressure gas refrigerant to be discharged. The high-temperature high-pressure gas refrigerant discharged from the compressor 10 passes through the four-way valve 11, flows through the first connection pipeline 4a, passes through the check valve 13b to flow out from the heat source apparatus 1. The high-temperature high-pressure gas refrigerant having flowed out from the heat source apparatus 1 passes through the refrigerant pipeline 4 to flow into the first relay unit 3a. The high-temperature high-pressure gas refrigerant having flowed into the first relay unit 3a flows into the first intermediate heat exchanger 15a after flowing into the intermediate heat exchanger 14. The high-temperature high-pressure gas refrigerant having flowed into the first intermediate heat exchanger 15a condenses and liquefies while releasing heat to the heat medium circulating in the heat medium circulation circuit to turn into a high-pressure liquid refrigerant.

The high-pressure liquid refrigerant having flowed out from the first intermediate heat exchanger 15a is throttled by the expansion valve 16d and expanded to turn into a low-temperature low-pressure gas-liquid two-phase state. The gas-liquid two-phase state refrigerant throttled by the expansion valve 16d is branched into the flow path passing through the expansion valve 16a and the flow path passing through the expansion valve 16b. The refrigerant having passed via the expansion valve 16a is further expanded by the expansion valve 16a, turns into a low-temperature low-pressure gas-liquid two-phase refrigerant to flow into the second intermediate heat exchanger 15b acting as an evaporator. The refrigerant having flowed into the second intermediate heat exchanger 15b absorbs heat from the heat medium therein to turn into a low-temperature low-pressure gas refrigerant. The low-temperature low-pressure gas refrigerant having flowed out from the second intermediate heat exchanger 15b passes via the expansion valve 16c.

On the other hand, the refrigerant having throttled by the expansion valve 16d and flowed into the expansion valve 16b merges with the refrigerant having passed via the second intermediate heat exchanger 15b and the expansion valve 16c to turn into a low-temperature low-pressure refrigerant having larger dryness. Then, the merged refrigerant flows out from the second relay unit 3b and the first relay unit 3a, and passes through the refrigerant pipeline 4 to flow into the heat source apparatus 1. The refrigerant having flowed into the heat source apparatus 1 passes through the second connection pipeline 4b via the check valve 13c to flow into the heat source side heat exchanger 12 acting as an evaporator. Then, the refrigerant having flowed into the heat source side heat exchanger 12 absorbs heat from the outdoor air therein to turn into a low-temperature low-pressure gas refrigerant. The low-temperature low-pressure gas refrigerant having flowed out from the heat source side heat exchanger 12 returns to the compressor 10 via the four-way valve 11 and accumulator 17. The expansion valve 16e is adapted to have a small opening degree such that no refrigerant flows.

Next, descriptions will be given to the heat medium flow in the heat medium circulation circuit.

In the heating-main operation mode, since both the first pump 21a and the second pump 21b are driven, the heat medium circulates via both pipelines 5a and 5b. The heat medium having heated by the heat source side refrigerant in the first intermediate heat exchanger 15a flows in the pipeline 5a by the first pump 21a. The heat medium having been cooled by the heat source side refrigerant in the second intermediate heat exchanger 15b flows in the pipeline 5b by the second pump 21b.

The heat medium having pressurized in and flowed out from the first pump 21a passes through the stop valve 24a via the flow path switching valve 22a to flow into the use side heat exchanger 26a. Then, the heat medium releases heat to the indoor air therein to heat the air-conditioning subject area of such as an inside of a room where the indoor unit 2 is installed. The heat medium having pressurized in and flowed out from the second pump 21b passes through the stop valve 24b via the flow path switching valve 22b to flow into the use side heat exchanger 26b. Then, the heat medium absorbs heat from the indoor air therein to cool the air-conditioning subject area of such as an inside of a room where the indoor unit 2 is installed.

The heat medium having flowed out from the use side heat exchanger 26a flows into the flow amount adjustment valve 25a. Then, through the operation of the flow amount adjustment valve 25a, only the heat medium necessary to cover the air-conditioning load required in the air-conditioning subject area such as an inside of a room flows into the use side heat exchanger 26a and the remaining heat medium flows through the bypass 27 so as to bypass the use side heat exchanger 26a. The heat medium passing through the bypass 27a does not contribute to heat exchange, merges with the heat medium having passed via the use side heat exchanger 26a, passes through the flow path switching valve 23a, and flows into the first intermediate heat exchanger 15a to be sucked into the second pump 21a again.

Likewise, the heat medium having flowed out from the use side heat exchanger 26b flows into the flow amount adjustment valve 25b. Then, through the operation of the flow amount adjustment valve 25b, only the heat medium necessary to cover the air-conditioning load required in the air-conditioning subject area such as an inside of a room flows into the use side heat exchanger 26b and the remaining heat medium flows through the bypass 27b so as to bypass the use side heat exchanger 26b. The heat medium passing through the bypass 27b does not contribute to heat exchange, merges with the heat medium having passed via the use side heat exchanger 26b, passes through the flow path switching valve 23b, and flows into the second intermediate heat exchanger 15b to be sucked into the second pump 21b again.

Meanwhile, a warm heat medium and a cold heat medium are made to flow into the use side heat exchanger 26a having the heating load and the use side heat exchanger 26b having the cooling load without being mixed through the operation of the flow path switching valve 22 (the flow path switching valves 22a and 22b) and the flow path switching valve 23 (the flow path switching valves 23a and 23b). The air-conditioning load required by the air-conditioning subject area such as an inside of a room can be covered by controlling the temperature difference between the third temperature sensor 33 and the fourth temperature sensor 34 to keep a target value.

Thereby, since there is no need to flow the heat medium to the use side heat exchanger 26 (including thermo-off) having no air-conditioning load, the flow path is closed by the stop valve 24 and the heat medium is prevented from flowing into the use side heat exchanger 26. In FIG. 7, while the heat medium is made to flow because in the use side heat exchangers 26a and 26b there is the air-conditioning load, there is no air-conditioning load in the use side heat exchangers 26c and 26d and the corresponding stop valves 24c and 24d are made to be a closed state. When a heating load or a cooling load is generated from the use side heat exchanger 26c or 26d, the stop valve 24c or 24d may be opened and the heat medium may be made to circulate.

As mentioned above, when the heating load is generated in the use side heat exchangers 26a to 26d, by switching the corresponding flow path switching valves 22a to 22d and the flow path switching valves 23a to 23d to the flow path connected with the first intermediate heat exchanger 15a, and when the cooling load is generated in the use side heat exchangers 26a to 26d, by switching the corresponding flow path switching valves 22a to 22d and the flow path switching valves 23a to 23d to the flow path connected with the second intermediate heat exchanger 15b, heating operation or cooling operation can be freely performed in each indoor unit 2.

The flow path switching valves 22a to 22d and the flow path switching valves 23a to 23d may be, in addition to those that can switch three flow paths such as a three-way valve, those that can switch flow paths such as a combination of two sets of those that open and close a two-direction flow path such as an on-off valve. Further, those that can change the flow amount of a three-way flow path such as a stepping motor drive type mixing valve and those that can change the flow amount of a two-way flow path such as an electronic expansion valve may be used in combination as a flow path switching valve, and in that case water hammer can be prevented caused by a sudden opening or closing of the flow path.

The air-conditioning load in the use side heat exchangers 26a to 26d can be expressed by the formula (1) as follows and becomes a product of the flow amount, density, and constant pressure specific heat of the heat medium by the temperature difference of the heat medium at the inlet and outlet of the use side heat exchangers 26a to 26d. Here, Vw denotes the flow amount of the heat medium, ρw the density of the heat medium, Cpw the constant pressure specific heat of the heat medium, Tw the temperature of the heat medium, a suffix "in" the value at the heat medium inlet of the use side heat exchangers 26a to 26d, the suffix "out" the value at the heat medium outlet of the use side heat exchangers 26a to 26d, respectively.

Formula 1

$$Q = V_w^* (\rho_{win}^* C p_{win}^* T_{win} - \rho_{wout}^* C p_{wout}^* T_{wout}) \sim V_w^* \rho_w^* C p_w^* (T_{win} - T_{wout}) \quad (1)$$

That is, when the heat medium flow amount made to flow into the use side heat exchangers 26a to 26d is constant, the temperature difference at the heat medium inlet/outlet varies according to the change in air-conditioning load in the use side heat exchangers 26a to 26d. With the temperature difference at the inlet/outlet of the use side heat exchangers 26a to 26d being a target, by controlling the flow amount adjustment valves 25a to 25d so that the difference approaches the target value, it is possible to make an excess heat medium flow into the bypasses 27a to 27d and control the flow amount flowing into the use side heat exchangers 26a to 26d. The target value of the temperature difference at the inlet/outlet of the use side heat exchangers 26a to 26d is set at 5 degrees C., for example.

In FIGS. 3 to 7, although descriptions are given to a case where the flow amount adjustment valves 25a to 25d are a mixing valve installed at the downstream side of the use side heat exchangers 26a to 26d, as an example, the use side heat exchangers 26a to 26d may be installed at the upstream side.

The heat medium that has exchanged heat with the use side heat exchangers 26a to 26d and the heat medium having passed through the bypasses 27a to 27d with no heat exchange and no change in temperature merge at a merging point thereafter. At the merging point, the formula (2) as follows holds. Here, $Tw_{in}$ and $Tw_{out}$ denote the heat medium temperature in the inlet and outlet of the use side heat exchangers 26a to 26d, Vw the heat medium flow amount flowing into the flow amount adjustment valves 25a to 25d, Vwr the heat medium flow amount flowing into the use side heat exchangers 26a to 26d, and Tw the heat medium temperature after the merging of the heat medium having flowed through the use side heat exchangers 26a to 26d and the heat medium having flowed through the bypasses 27a to 27d, respectively.

Formula 2

$$T_w=(V_{wr}/V_w)*T_{wout}+(1-V_{wr}/V_w)*T_{win} \qquad (2)$$

That is, when the heat medium having exchanged heat with the use side heat exchangers 26a to 26d and being subjected temperature change and the heat medium having passed through the bypasses 27a to 27d with no heat exchange and no change in temperature merge, the temperature difference of the heat medium approaches the inlet temperature of the use side heat exchangers 26a to 26d by a by-passed flow amount. For example, when the total flow amount is 20 L/min, the heat medium inlet temperature of the use side heat exchangers 26a to 26d 7 degrees C., the outlet temperature 13 degrees C., and the flow amount made to flow to the use side heat exchangers 26a to 26d side 10 L/min, the temperature after the merging becomes 10 degrees C. by the formula (2).

Now, the heat media of the merged temperature return from each indoor unit 2 and are merged to flow into the first intermediate heat exchanger 15a and the second intermediate heat exchanger 15b. Thereby, if the heat exchange amount is not changed in the first intermediate heat exchanger 15a or the second intermediate heat exchanger 15b, the temperature differences at the inlet and outlet become almost the same through the heat exchange in the first intermediate heat exchanger 15a or the second intermediate heat exchanger 15b.

That is, suppose that the inlet/outlet temperature difference of the first intermediate heat exchanger 15a or the second intermediate heat exchanger 15b is 6 degrees C. and originally, the inlet temperature is 13 degree C. and outlet temperature is 7 degrees C. in the first intermediate heat exchanger 15a or the second intermediate heat exchanger 15b. Then, the air-conditioning load decreases in the use side heat exchangers 26a to 26d and the inlet temperature is lowered to 10 degrees C. of the first intermediate heat exchanger 15a or the second intermediate heat exchanger 15b. Then, if nothing is done, since the first intermediate heat exchanger 15a or the second intermediate heat exchanger 15b exchanges heat of almost the same amount, the heat medium flows out from the first intermediate heat exchanger 15a or the second intermediate heat exchanger 15b at 4 degrees C., which is repeated to cause the temperature to be decreased little by little.

In order to prevent the above, the rotation speed of the pump, which is the first pump 21a and the second pump 21b, may be varied according to the change in the air-conditioning load of the use side heat exchangers 26a to 26d so that the heat medium outlet temperature of the first intermediate heat exchanger 15a or the second intermediate heat exchanger 15b detected by the first temperature sensors 31a and 31b approaches the target value. Thereby, when the air-conditioning load is decreased, the rotation speed of the pump is lowered to result in energy-saving, and when the air-conditioning load is increased, the rotation speed of the pump is raised so that the air-conditioning load can be covered.

The second pump 21b is made to be driven when cooling load or dehumidifying load occurs in any of the use side heat exchangers 26a to 26d and stopped when there is neither cooling load nor dehumidifying load in every use side heat exchanger 26a to 26d.

The first pump 21a is made to be driven when heating load occurs in any of the use side heat exchangers 26a to 26d and stopped when there is no heating load in every use side heat exchanger 26a to 26d.

Next, a case where each operation mode described above is made to stop will be considered. It is assumed that operation stop instruction is issued from a remote controller. Then, the air flow is made to stop by stopping the fan attached to each indoor unit 2 and the refrigerant flow is made to stop by stopping the compressor 10. In general, since the indoor unit 2 and the heat source apparatus 1 are controlled by separate controllers, all indoor units 2 are not necessarily connected with a single remote controller, and in one indoor unit 2 or in one room, a single remote controller is often installed.

In the conventional air-conditioning apparatus, since the refrigerant (heat source side refrigerant) is made to circulate in all the use side heat exchangers, when a stop instruction is input from the remote controller, it is arranged that the fan of the corresponding indoor unit is stopped firstly, the solenoid valves and the electronic expansion valves or the like are operated, and the refrigerant flow to each indoor unit is stopped. Then, according to the stop instruction from the remote controller corresponding to the indoor unit operated last, the fan of the corresponding indoor unit is stopped, the refrigerant flow path is closed, and thereafter the compressor 10 is stopped.

On the other hand, in the air-conditioning apparatus 100 according to Embodiment 1, the refrigerant delivered from the heat source apparatus 1 exchanges heat with the heat medium in the intermediate heat exchanger 15 and the heat medium is adapted to flow in the pipeline 5 of the use side heat exchangers 26a to 26d. Like the conventional air-conditioning apparatus, it is considered that when the stop instruction is issued to all the indoor units 2 under these conditions, the corresponding fan may be stopped, the flow path of the heat medium may be closed by the stop valve 24, thereafter the pump 21 may be stopped, and the compressor 10 may be stopped.

However, in the case where the air-conditioning apparatus is stopped under such a order, since the pump 21 is not in operation when the compressor 10 is stopped. Therefore, when the stop of the compressor 10 is delayed, because no heat medium flows in the intermediate heat exchanger 15, the temperature of the heat medium in this portion abruptly increases or decreases, the high-pressure of the compressor 10 abruptly increases or the low-pressure abruptly decreases in response to that, possibly resulting in abnormal stop. In particular, when the second intermediate heat exchanger 15b operates as an evaporator, the heat medium in the first intermediate heat exchanger 15a and the second intermediate heat exchanger 15b freezes, supposedly damaging the first intermediate heat exchanger 15a and the second intermediate heat exchanger 15b. Consequently, each operation mode is desirably stopped according to the procedure as follows.

Figure 8:
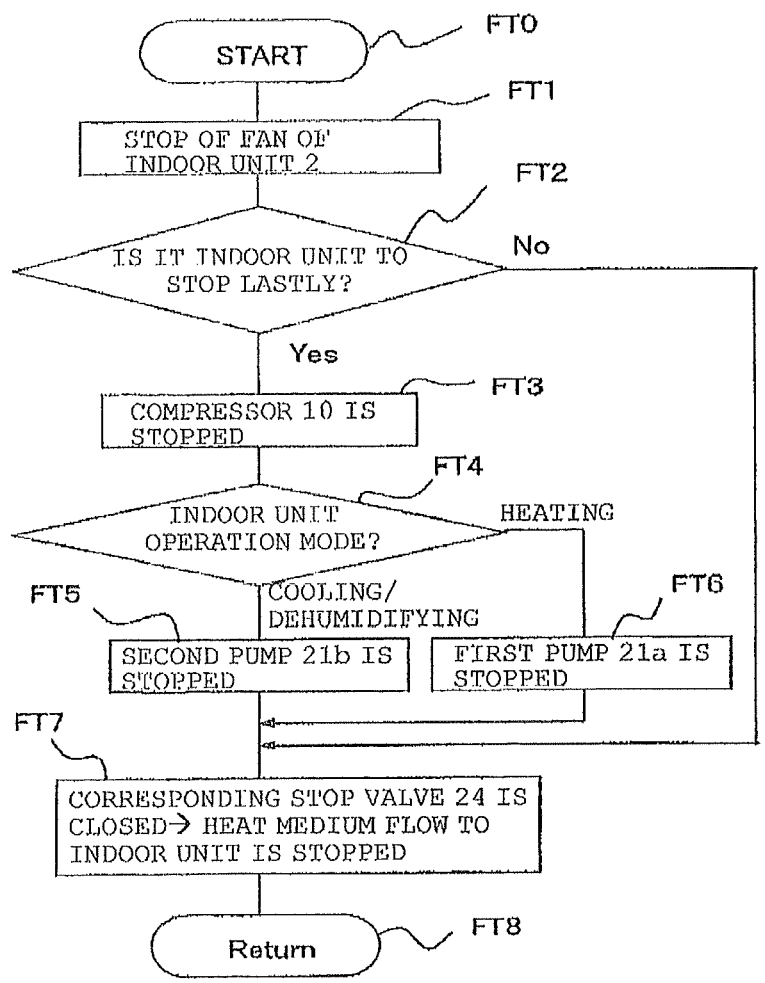
FIG. 8 is a flowchart showing the processing flow at the time of stopping each operation mode.

FIG. 8 is a flowchart showing the processing flow at the time of stopping each operation mode. Based on FIG. 8, stop of each operation mode will be explained. The controller 60 starts processing to stop each operation mode by the stop instruction input from the remote controller (FT0). Firstly, the controller 60 stops the fan of the corresponding indoor unit 2 (FT1). Then, the controller 60 judges whether the indoor unit 2 to be stopped is the indoor unit 2 to be stopped last (FT2). When the controller 60 judges that the indoor unit 2 to be stopped is not the indoor unit 2 to be stopped last (FT2: No), the corresponding stop valve 24 is closed and the heat medium flow into each indoor unit 2 is stopped (FT7).

On the other hand, when the controller 60 judges that the indoor unit 2 to be stopped is the indoor unit 2 to be stopped last (FT2: Yes), the compressor 10 is made to stop (FT3). Thereafter, the controller 60 judges the operation mode in execution (FT4). When the controller 60 judges that it is cooling or dehumidifying operation mode (an operation mode in which only cooling load or dehumidifying load is generated in any of the use side heat exchanger 26) (FT4: cooling/dehumidifying), the second pump 21b is made to stop (FT5).

When the controller 60 judges that it is heating operation mode (an operation mode in which only heating load is generated in any of use side heat exchangers 26) (FT4: heating), the first pump 21a is made to stop (FT6). That is, the controller 60 stops the first pump 21a or the second pump 21b according to the operation mode. Finally, the controller 60 closes the corresponding stop valve 24 to stop the heat medium flow to each indoor unit 2 (FT7). Then, processing at the time of stopping each operation mode is terminated (FT8).

When each operation mode is stopped as mentioned above, since the first pump 21a or the second pump 21b is in operation when the compressor 10 stops, a first heat medium circulates in the first intermediate heat exchanger 15a or the second intermediate heat exchanger 15b, causing no abnormal change in the high-pressure and low-pressure of the compressor 10. When all the stop valves 24a to 24d are closed prior to the stop of the first pump 21a or the second pump 21b, the circulation path of the heat medium is closed. Therefore, since the operation of the first pump 21a or the second pump 21b cannot be continued, the last stop valve 24 is made to close after both first and second pumps 21a and 21b are stopped.

When it is possible to stop the compressor 10 and the first pump 21a or the second pump 21b almost at the same time, they may be stopped almost simultaneously. The term almost simultaneously here means that that they may be stopped at the same time, or even if the stop of the first pump 21a or the second pump 21b may be a little earlier, the stop of the compressor 10 right after thereof is included within a short time period, for example, within one second or two seconds so that no affect is caused in the high-pressure or low-pressure of the refrigeration cycle. The temporal context of the stop valves 24a to 24d and the first pump 21a or the second pump 21b is the same.

Figure 9:
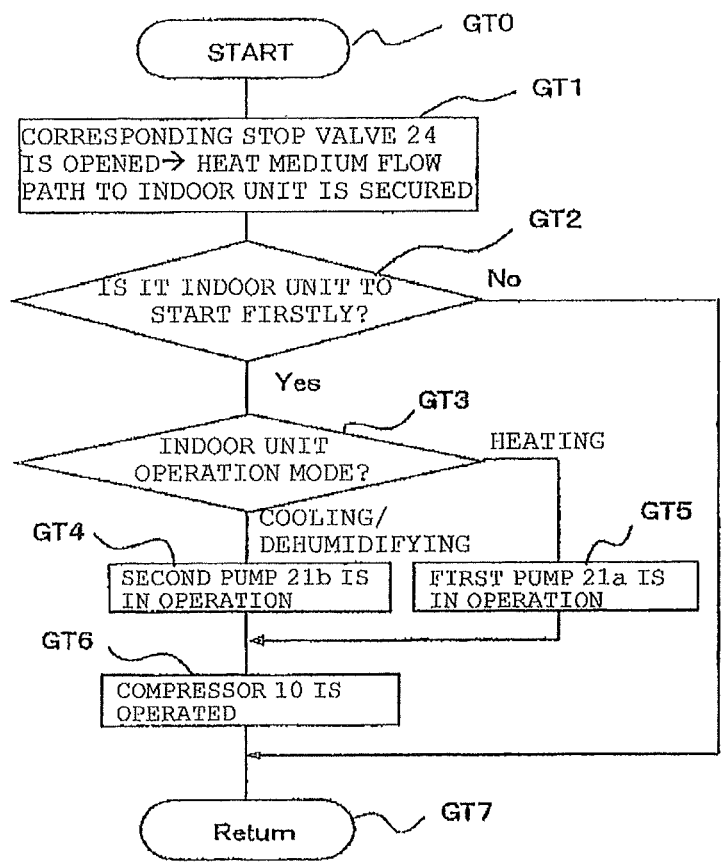
FIG. 9 is a flowchart showing the processing flow at the time of starting each operation mode.

FIG. 9 is a flowchart showing the processing flow at the time of starting each operation mode. Based on FIG. 9, descriptions will be given to start of each operation mode. The controller 60 starts processing to start each operation mode by the operation instruction input from the remote controller (GT0). Firstly, the controller 60 opens the stop valve 24 corresponding to the use side heat exchanger 26 to be operated to secure the heat medium flow path (GT1). Then, the controller 60 judges whether the indoor unit 2 to be started is the indoor unit 2 to be firstly started (GT2).

When judging that the indoor unit 2 to be started is not the indoor unit 2 to be firstly started (GT2; No), processing is terminated (GT7).

On the other hand, when the controller 60 judges that the indoor unit 2 to be started is the indoor unit 2 to be firstly started (GT2; Yes), the operation mode to be executed is judged (GT3). When the controller 60 judges that it is cooling or dehumidifying operation mode (GT3; cooling/dehumidifying), the second pump 21b is made to operate (GT4). When the controller 60 judges that the operation mode to be executed is the heating operation mode (GT4; heating), the first pump 21a is made to operate (GT5). That is, the controller 60 operates either the first pump 21a or the second pump 21b according to the operation mode. The controller 60 finally operates the compressor 10 after securing the heat source of the compressor 10 (GT6). Then, processing at the time of starting each operation mode is terminated (GT7).

Although the fan of the indoor unit 2 is not shown, it is adapted to be simultaneously started with the start instruction at the time of the cooling operation mode and to be operated after the heat medium temperature has risen to some degree at the time of heating operation mode. When it is possible to start the compressor 10 and the first pump 21a or the second pump 21b almost at the same time, they may be started almost simultaneously. The term almost simultaneously here means that that they may be started at the same time, or even if the start of the compressor 10 may be a little earlier, the start of the first pump 21a or the second pump 21b right after thereof is included within a short time period, for example, within one second or two seconds so that no affect is caused in the high-pressure or low-pressure of the refrigeration cycle. The temporal context of the stop valves 24a to 24d and the first pump 21a or the second pump 21b is the same.

Figure 10:
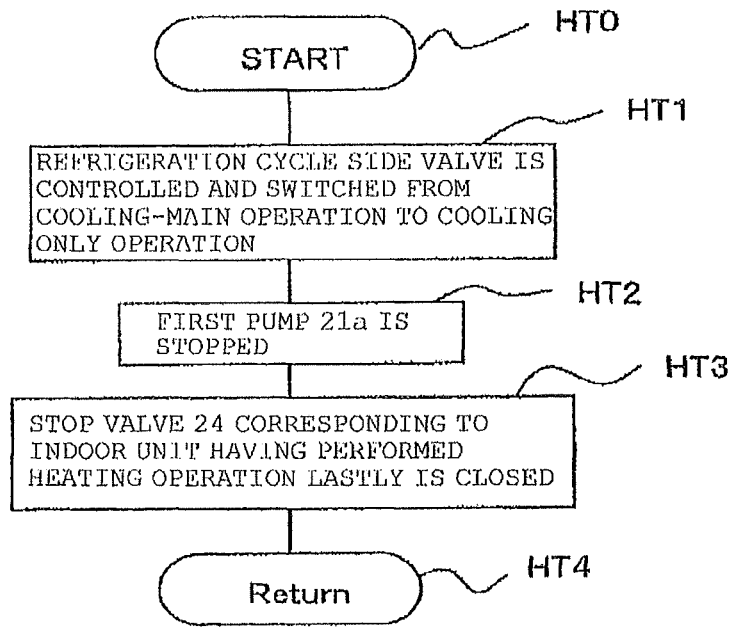
FIG. 10 is a flowchart showing the processing flow at the time of switching from the cooling-main operation mode to the cooling only operation mode.

FIG. 10 is a flowchart showing the processing flow at the time of switching from the cooling-main operation mode to the cooling only operation mode. Based on FIG. 10, descriptions will be given to the processing flow at the time of switching from the cooling-main operation mode to the cooling only operation mode. At the time of the cooling-heating simultaneous operation in which cooling operation and heating operation are mixed, that is, at the time of switching operation from the cooling-main operation mode or the heating-main operation, switching should be performed while paying attention to the order of ON/OFF of the compressor 10 and the pump 21.

The controller 60 starts processing at the time of switching from cooling-main operation mode to the cooling only operation mode by the operation instruction input from the remote controller (HT0). That is, the controller 60 switches the heat source side refrigerant flow at the refrigeration cycle side from cooling-main operation mode to the cooling only operation mode (HT1). Thereafter, the controller 60 stops the first pump 21a at the heating side, which is a pump not corresponded to the operation mode (here, cooling only operation mode) after the switching (HT2). When the first pump 21a is stopped prior to the switching of the operation mode, high-pressure of the refrigerant increases and operation efficiency is deteriorated, possibly resulting in an abnormal stop.

However, by switching operation modes in such an order mentioned above, mode switching can be performed safely. The controller 60 closes the stop valve 24 corresponding to the indoor unit 2 that performed heating operation lastly after stopping the first pump 21a to close the flow path of the heat medium (HT3). Then, processing at the time of switching from the cooling-main operation mode to the cooling only operation mode is terminated (HT4).

Figure 11:
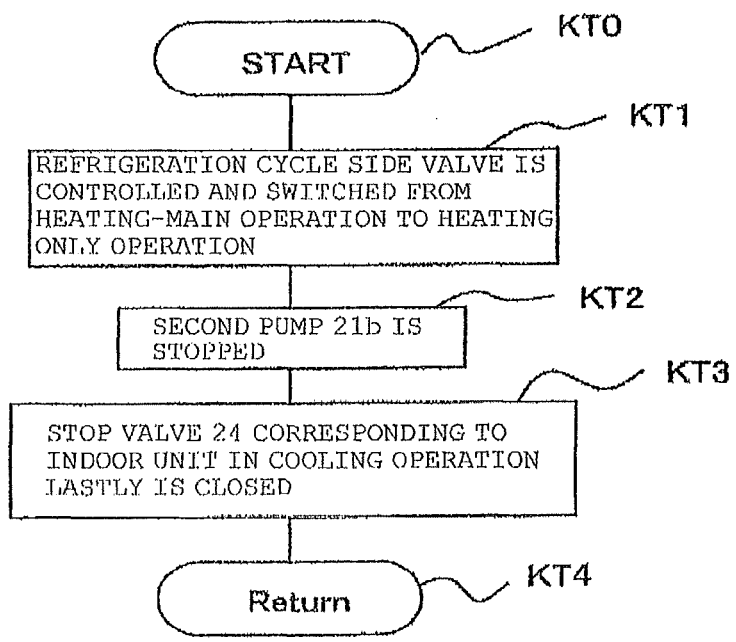
FIG. 11 is a flowchart showing the processing flow at the time of switching from the heating-main operation mode to the heating only operation mode.

FIG. 11 is a flowchart showing the processing flow at the time of switching from the heating-main operation mode to the heating only operation mode. Based on FIG. 11, descriptions will be given to the processing flow at the time of switching from the heating-main operation mode to the heating only operation mode. As explained in FIG. 10, at the time of the cooling-heating simultaneous operation in which cooling operation and heating operation are mixed, that is, at the time of switching operation mode from the cooling-main operation mode or the heating-main operation, switching should be performed while paying attention to the order of ON/OFF of the compressor 10 and the pump 21.

The controller 60 starts processing at the time of switching from the heating-main operation mode to the heating only operation mode by the operation instruction input from the remote controller (KT0). That is, the controller 60 switches the heat source side refrigerant flow at the refrigeration cycle side from the heating-main operation mode to the heating only operation mode (KT1). Thereafter, the controller 60 stops the second pump 21b at the cooling side, which is a pump not corresponded to the operation mode (here, the heating only operation mode) after the switching (KT2). When the second pump 21b is stopped prior to the switching of the operation mode, since the heat source to evaporate the refrigerant disappears, the low-pressure of the refrigerant decreases, possibly resulting in freezing of the heat medium.

However, by switching operation modes in such an order mentioned above, mode switching can be performed safely. The controller 60 closes the stop valve 24 corresponding to the indoor unit 2 that performed cooling operation lastly after stopping the second pump 21b to close the heat medium flow path (KT3). Then, processing at the time of switching from the heating-main operation mode to the heating only operation mode is terminated (HT4).

At the time of switching explained in FIGS. 10 and 11, when it is possible to perform switching of the operation mode and the stop of the first pump 21a or the second pump 21b almost at the same time, they may be performed almost simultaneously. The term almost simultaneously here means that that they may be performed exactly at the same time, or even if the stop of the first pump 21a or the second pump 21b may be a little earlier, the switching of the operation mode right after thereof is included within a short time period, for example, within one second or two seconds so that no affect is caused in the high-pressure or low-pressure of the refrigeration cycle. The temporal context of the stop valves 24a to 24d and the first pump 21a or the second pump 21b is the same.

Figure 12:
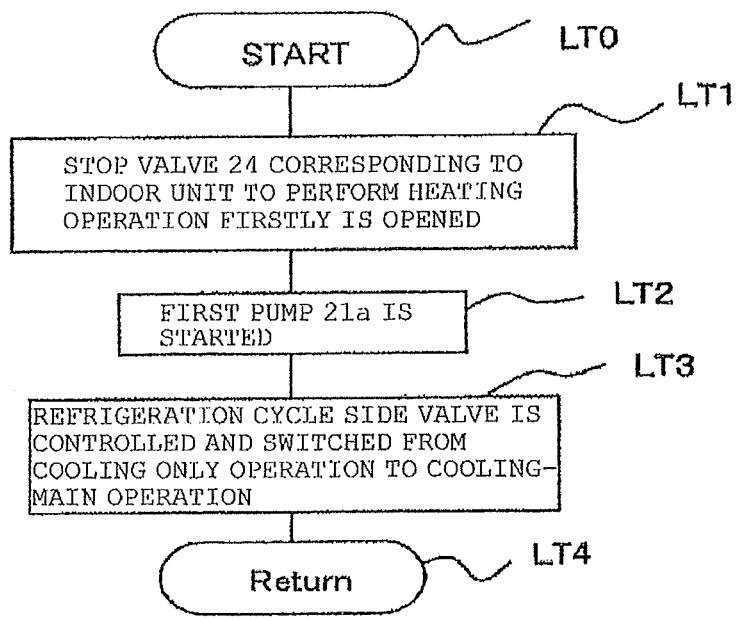
FIG. 12 is a flowchart showing the processing flow at the time of switching from the cooling only operation mode to the cooling-main operation mode.

FIG. 12 is a flowchart showing the processing flow at the time of switching from the cooling only operation mode to the cooling-main operation mode. Based on FIG. 12, descriptions will be given to the processing flow at the time of switching from the cooling only operation mode to the cooling-main operation mode. At the time of the cooling-heating simultaneous operation in which cooling operation and heating operation are mixed, that is, at the time of switching operation mode to cooling-main operation mode or heating-main operation, switching should be performed while paying attention to the order of ON/OFF of the compressor 10 and the pump 21.

The controller 60 starts processing at the time of switching from cooling only operation mode to cooling-main operation mode by the operation instruction input from the remote controller (LT0). That is, the controller 60 opens the stop valve 24 corresponding to the indoor unit 2 that performs heating operation firstly (LT1). Then, the controller 60 starts the first pump 21a at the heating side (LT2). Then, the controller 60 switches the operation mode to be stopped to cooling-main operation mode (LT3).

When the operation mode is switched prior to the start of the first pump 21a, high-pressure of the refrigerant increases and operation efficiency is deteriorated, possibly resulting in an abnormal stop. However, by performing switching in such an order mentioned above, mode switching can be performed safely. As shown in LT1, the stop valve 24 corresponding to the indoor unit 2 having a heating load has to be made open before starting the first pump 21a and the flow path of the heat medium has to be secured.

Figure 13:
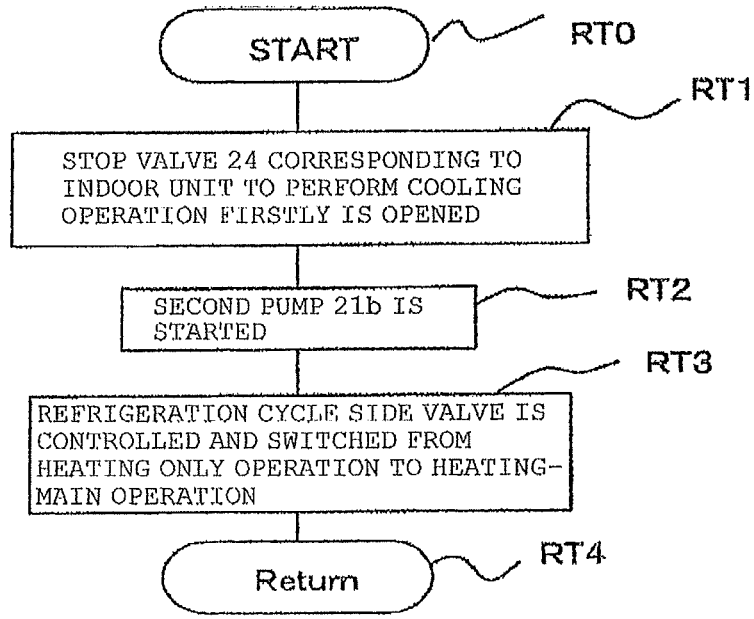
FIG. 13 is a flowchart showing the processing flow at the time of switching from the heating only operation mode to the heating-main operation mode.

FIG. 13 is a flowchart showing the processing flow at the time of switching from the heating only operation mode to the heating-main operation mode. Based on FIG. 13, descriptions will be given to the processing flow at the time of switching from heating only operation mode to the heating-main operation mode. At the time of the cooling-heating simultaneous operation in which cooling operation and heating operation are mixed, that is, at the time of switching operation mode to cooling-main operation mode or heating-main operation, switching should be performed while paying attention to the order of ON/OFF of the compressor 10 and the pump 21.

The controller 60 starts processing at the time of switching from heating only operation mode to heating-main operation mode by the operation instruction input from the remote controller (RT0). That is, the controller 60 opens the stop valve 24 corresponding to the indoor unit 2 that performs cooling operation firstly (RT1). Then, the controller 60 starts the second pump 21b at the cooling side (RT2). Then, the controller 60 switches the operation mode to be stopped to heating-main operation mode (RT3).

When the operation mode is switched prior to the start of the second pump 21b, since there is no heat source to evaporate the refrigerant, low-pressure of the refrigerant decreases, possibly resulting in freezing of the heat medium. However, by performing switching in such an order mentioned above, mode switching can be performed safely. As shown in RT1, the stop valve 24 corresponding to the indoor unit 2 having a cooling load has to be made open before starting the second pump 21b and the flow path of the heat medium has to be secured.

At the time of the switching explained in FIGS. 12 and 13, when it is possible to perform switching of the operation mode and the start of the first pump 21a or the second pump 21b almost at the same time, they may be performed almost simultaneously. The term almost simultaneously here means that that they may be performed at the same time, or even if the switching of the operation mode may be a little earlier, the start of the first pump 21a or the second pump 21b is included right after within a short time period, for example, within one second or two seconds so that no affect is caused in the high-pressure or low-pressure of the refrigeration cycle. The temporal context of the stop valves 24a to 24d and the first pump 21a or the second pump 21b is the same.

As mentioned above, in the air-conditioning apparatus 100 according to Embodiment 1, the stop, start or the switching of the operation mode of the compressor 10 is performed during the stop, start or the switching of the operation mode of the system with the heat medium being circulated in the intermediate heat exchanger 15. Thereby, it is possible to have stable operation, to prevent the refrigeration cycle operation efficiency from being deteriorated such that high-pressure of the refrigerant becoming high or low, and to improve system efficiency, achieving energy-saving.

That is, by performing stop control and start control, the air-conditioning apparatus 100 does not fall into poor efficiency operation conditions such that high-pressure increases or low-pressure decreases of the refrigeration cycle, can make the operation efficiency of the entire system including start and stop improve to achieve high energy-saving. When switching from cooling-main operation mode to heating-main operation mode or heating-main operation mode to cooling-main operation mode, since the first pump 21a and the second pump 21b are in operation in either operation mode, they can be switched as they are.

As mentioned above, since the air-conditioning apparatus 100 according to Embodiment 1 is adapted to transfer the heating energy and/or the cooling energy of the refrigeration cycle to the use side heat exchanger 26 via two or more intermediate heat exchangers 15, the outdoor side housing (the heat source apparatus 1) can be installed in the outdoor space 6 at the outdoor side, the indoor side housing (the indoor unit 2) in the indoor side living space 7, and the heat medium conversion housing (the relay unit 3) in the non-living space 50, respectively. Therefore, the heat source side refrigerant can be suppressed from flowing into the living space 7 and safety and reliability of the system can be improved.

In the air-conditioning apparatus 100, since the heat medium such as water and brine is allowed to flow through the heat medium circulation circuit, it is possible to reduce the heat source side refrigerant amount and to mitigate the influence on the environment at the time of the refrigerant leaking. Further, by connecting the relay unit 3 and two or more indoor units 2 with two heat medium pipelines (the pipeline 5) respectively, the air-conditioning apparatus 100 can reduce carrying power of water, facilitating energy-saving and easy installation work.

Embodiment 2

Figure 14:
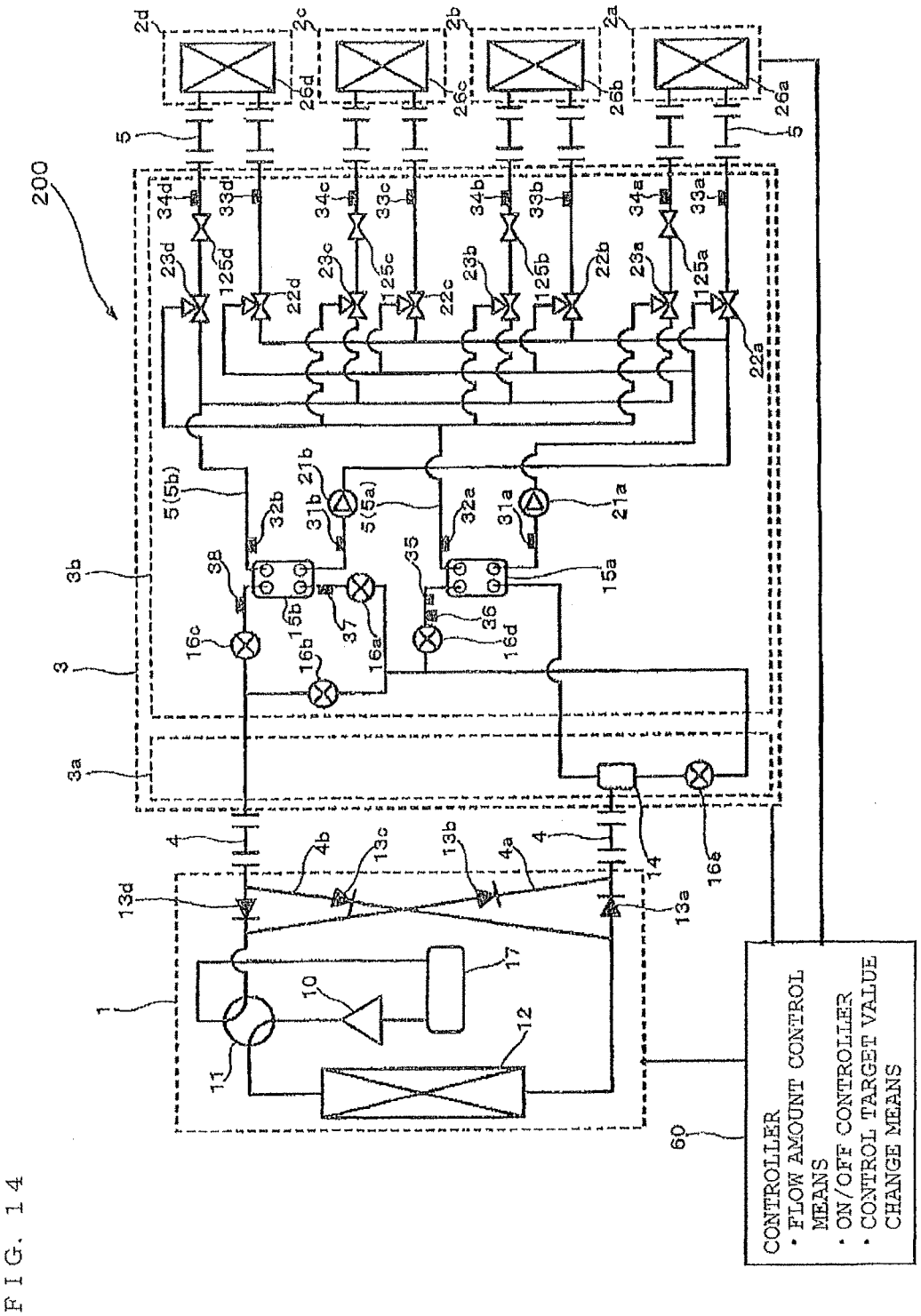
FIG. 14 is a circuit diagram showing the circuit configuration of the air-conditioning apparatus according Embodiment 2.

FIG. 14 is a circuit diagram showing a circuit configuration of the air-conditioning apparatus 200 according Embodiment 2. Based on FIG. 14, the circuit configuration of the air-conditioning apparatus 200 will be explained. The air-conditioning apparatus 200 performs cooling operation or heating operation using the refrigeration cycle (the refrigeration cycle and the heat medium circulation circuit) that circulates the refrigerant (the heat source side refrigerant and the heat medium) like the air-conditioning apparatus 100. The air-conditioning apparatus 200 differentiates the configuration of the flow amount adjustment valves 125a to 125d corresponding to the flow amount adjustment valves 25a to 25d from the air-conditioning apparatus 100 according to Embodiment 1. In Embodiment 2, descriptions will be given focusing on differences from Embodiment 1, the same signs will be provided with the same portions as Embodiment 1, and descriptions will be omitted.

Relay Unit 3

The relay unit 3 is provided with four flow amount adjustment valves 125. The relay unit 3 is provided with neither bypass 27 nor stop valve 24. That is, since in the air-conditioning apparatus 200, the flow amount adjustment valve 125 is constituted by a two-way flow path adjustment valve, the bypass 27 connecting the pipeline 5 and the flow amount adjustment valve 125 between the stop valve 24 and the use side heat exchanger 26 and the stop valve 24 that opens and closes the heat medium flow path become unnecessary. Other configurations of the air-conditioning apparatus 200 are the same as those of the air-conditioning apparatus 100 according to Embodiment 1.

The four flow amount adjustment valves 125 (the flow amount adjustment valves 125a to 125d) are constituted by two-way flow path adjustment valves and switch the heat medium flow path. The flow amount adjustment valve 125 is adapted to be provided for the number (it is four, here) corresponding to the number of the installed indoor units 2. The flow amount adjustment valve 125 is connected with the use side heat exchanger 26 in one side and with the flow path switching valve 23 in the other side respectively and provided at the outlet side of the heat medium flow path of the use side heat exchanger 26.

In this case, since the heat medium flow path can be closed by the flow amount adjustment valves 25a to 25d, there is no need to install the stop valves 24a to 24d. Therefore, the stop valve 24 may be replaced by the flow amount adjustment valve 25. By making them correspond with the indoor units 2, they are illustrated as flow amount adjustment valves 125a, 125b, 125c, and 125d from under this sheet. The flow amount adjustment valve 125 corresponds with the flow amount adjustment valve 25 of the air-conditioning apparatus 100 according to Embodiment 1.

Figure 15:
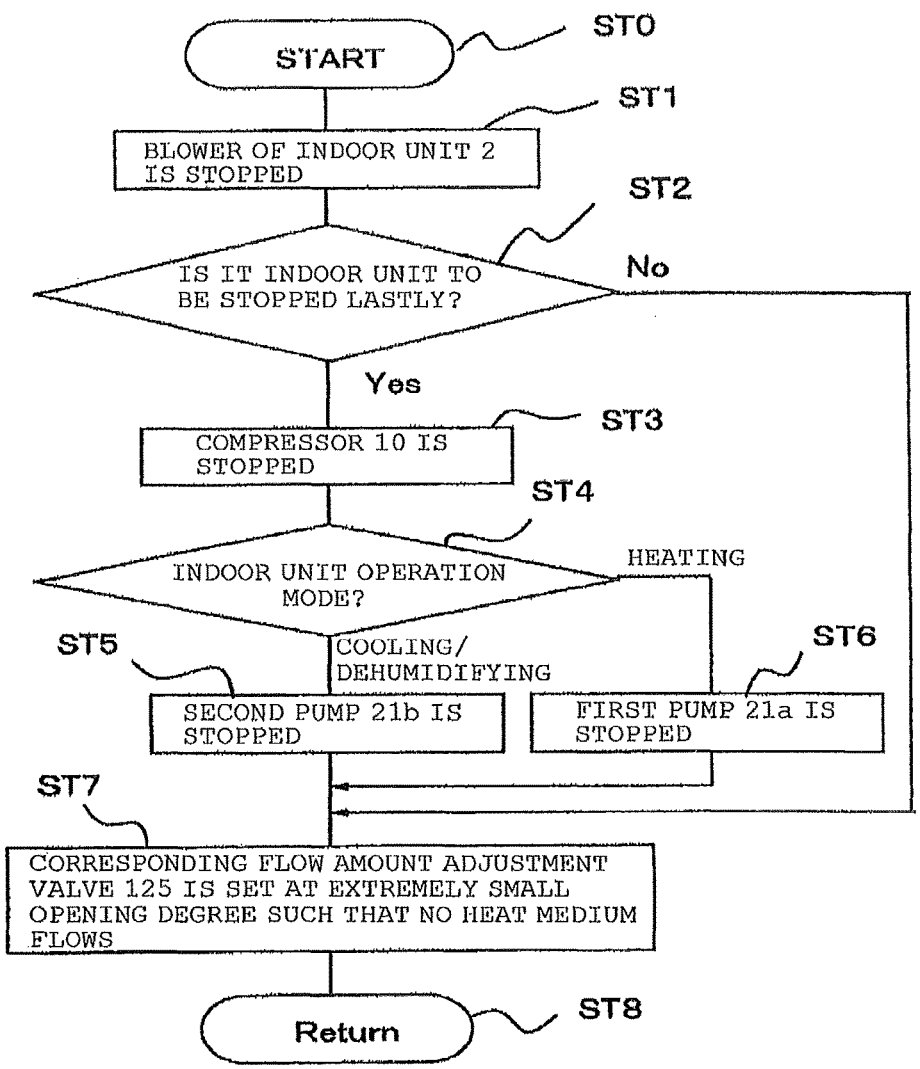
FIG. 15 is a flowchart showing the processing flow at the time of stopping each operation mode.

Here, operations of the air-conditioning apparatus 200 will be explained. FIG. 15 is a flowchart showing the processing flow at the time of stopping each operation mode. Based on FIG. 15, the stop of each operation mode will be explained. The controller 60 starts processing to stop each operation mode by the stop instruction input from the remote controller (ST1). Firstly, the controller 60 stops the fan of the corresponding indoor unit 2 (ST1). Then, the controller 60 judges whether the indoor unit 2 to be stopped is the indoor unit 2 to be lastly stopped (ST2). When the controller 60 judges that the indoor unit 2 to be stopped is not the indoor unit 2 to be lastly stopped (ST2: No), the corresponding flow amount adjustment valve 125 is set at an extremely small opening area such that no heat medium flows therethrough and the heat medium flow into each indoor unit 2 is made to stop (ST7).

On the other hand, when the controller 60 judges that the indoor unit 2 to be stopped is the indoor unit 2 to be lastly stopped (ST2: Yes), the compressor 10 is made to stop (ST3). Thereafter, the controller 60 judges the operation mode having been in execution (ST4). When the controller 60 judges that it is cooling or dehumidifying operation mode (an operation mode in which only cooling load or dehumidifying load is generated in any of the use side heat exchangers 26) (ST4: cooling/dehumidifying), the second pump 21b is made to stop (ST5).

When the controller 60 judges that it is heating operation mode (an operation mode in which only heating load is generated in any of the use side heat exchangers 26) (ST4: heating), the first pump 21a is made to stop (ST6). That is, the controller 60 stops either the first pump 21a or the second pump 21b according to the operation mode. Finally, the controller 60 sets the corresponding flow amount adjustment valve 125 at an extremely small opening area such that no heat medium flows therethrough and the heat medium flow into each indoor unit 2 is made to stop (ST7). And the processing at the time of stopping each operation mode is terminated (ST8).

If each operation mode is stopped as mentioned above, since the first pump 21a or the second pump 21b is in operation when the compressor 10 is stopped, a first refrigerant circulates in the first intermediate heat exchanger 15a or the second intermediate heat exchanger 15b, causing no abnormal change in the high-pressure and low-pressure in the compressor 10. When all the flow amount adjustment valves 125a to 125d are closed prior to the stop of the first pump 21a or the second pump 21b, the circulation path of the heat medium is closed. Therefore, since the operation of the first pump 21a or the second pump 21b cannot be continued, the last flow amount adjustment valve 125 is made to close after both first and second pumps 21a and 21b are stopped.

When it is possible to stop the compressor 10 and the first pump 21a or the second pump 21b almost at the same time, they may be stopped almost simultaneously. The definition of the term almost simultaneously is the same as Embodiment 1.

Figure 16:
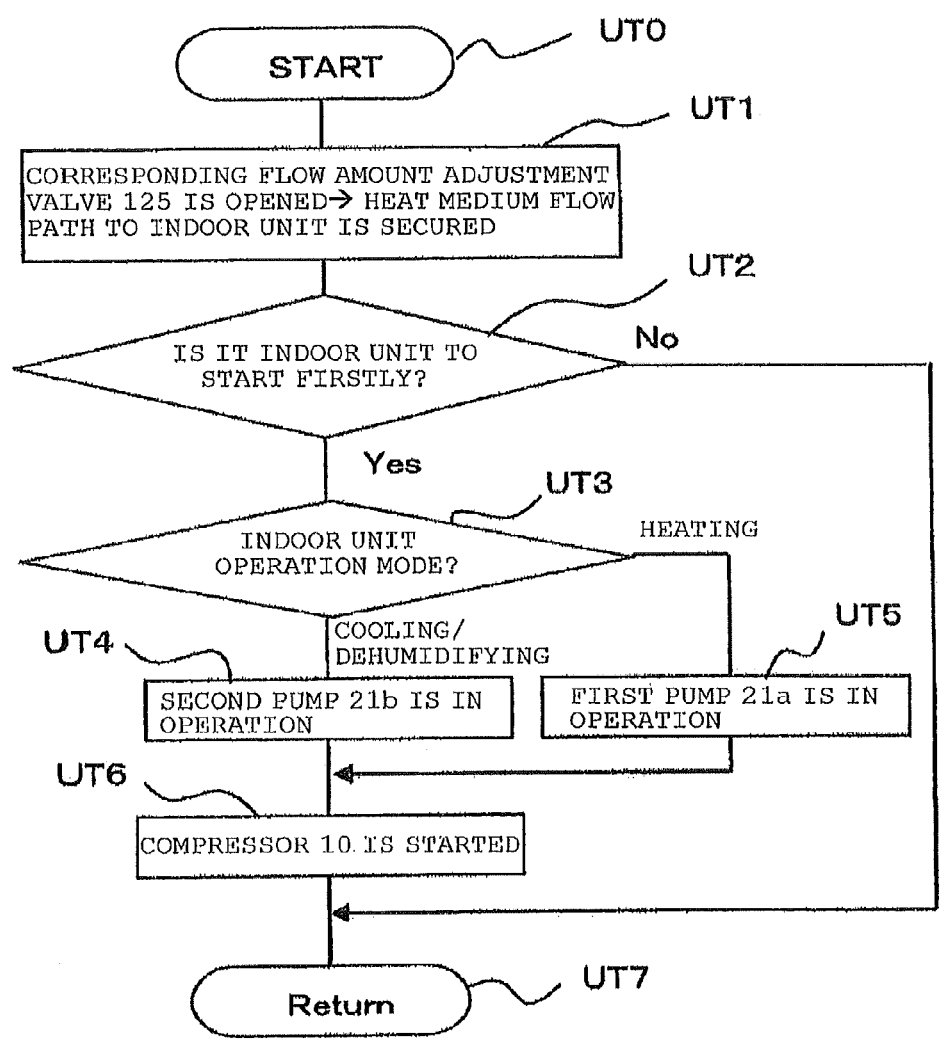
FIG. 16 is a flowchart showing the processing flow at the time of starting each operation mode.

FIG. 16 is a flowchart showing the processing flow at the time of starting each operation mode. Based on FIG. 16, descriptions will be given to start of each operation mode. The controller 60 starts processing to start each operation mode by the operation instruction input from the remote controller (UT0). Firstly, the controller 60 opens the flow amount adjustment valve 125 corresponding to the use side heat exchanger 26 to be operated to secure the heat medium flow path (UT1). Then, the controller 60 judges whether the indoor unit 2 to be started is the indoor unit 2 to be firstly started (UT2). When judging that the indoor unit 2 to be driven is not the indoor unit 2 to be firstly started (UT2; No), processing is terminated (UT7).

On the other hand, when the controller 60 judges that the indoor unit 2 to be started is the indoor unit 2 to be firstly started (UT2; Yes), it judges the operation mode to be executed (UT3). When the controller 60 judges that it is cooling or dehumidifying operation mode (UT3; cooling/dehumidifying), the second pump 21b is made to operate (UT4). When the controller 60 judges that it is heating operation mode (UT4; heating), the first pump 21a is made to operate (UT5). That is, the controller 60 operates either the first pump 21a or the second pump 21b according to the operation mode. The controller 60 finally operates the compressor 10 after securing the heat source of the compressor 10 (UT6). Then, processing at the time of starting each operation mode is terminated (UT7).

Although the fan of the indoor unit 2 is not shown, it is adapted to be simultaneously started with the start instruction at the time of cooling operation mode and to be operated after the heat medium temperature has risen to some degree at the time of heating operation mode. When it is possible to start the compressor 10 and the first pump 21a or the second pump 21b almost at the same time, they may be started almost simultaneously. The definition of the term almost simultaneously is the same as that of Embodiment 1.

Figure 17:
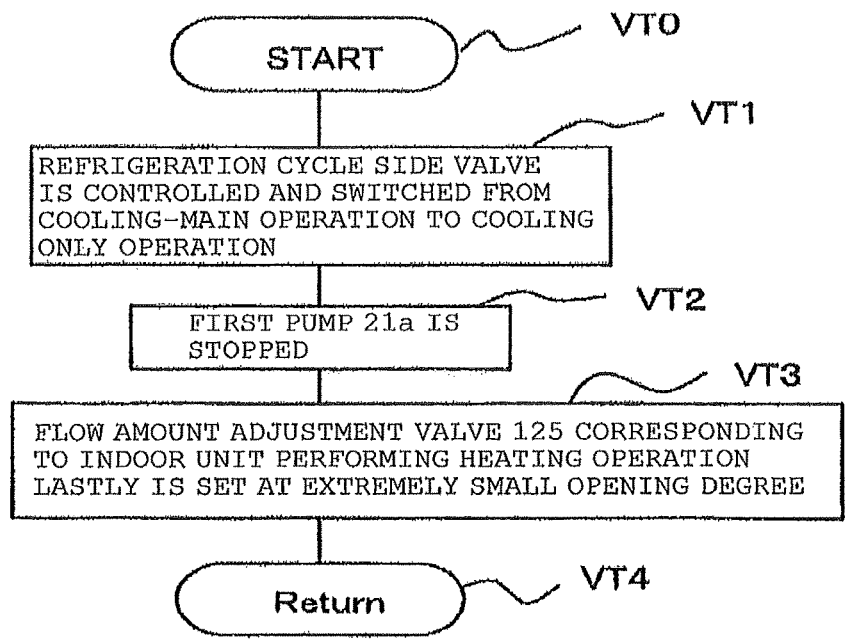
FIG. 17 is a flowchart showing the processing flow at the time of switching from the cooling-main operation mode to the cooling only operation mode.

FIG. 17 is a flowchart showing the processing flow at the time of switching from cooling-main operation mode to cooling only operation mode. Based on FIG. 17, descriptions will be given to the processing flow at the time of switching from cooling-main operation mode to cooling only operation mode. At the time of cooling-heating simultaneous operation in which cooling operation and heating operation are mixed, that is, at the time of switching operation from cooling-main operation mode or heating-main operation, switching should be performed while paying attention to the order of ON/OFF of the compressor 10 and the pump 21.

The controller 60 starts processing at the time of switching from cooling-main operation mode to cooling only operation mode by the operation instruction input from the remote controller (VT0). That is, the controller 60 switches the heat source side refrigerant flow at the refrigeration cycle side from cooling-main operation mode to cooling only operation mode (VT1). Then, the controller 60 stops the first pump 21a at the heating side (HT2). When the first pump 21a is stopped prior to the switching of the operation mode, high-pressure of the refrigerant increases and operation efficiency is deteriorated, possibly resulting in an abnormal stop.

However, by switching operation modes in such an order mentioned above, mode switching can be performed safely. The controller 60 sets the flow amount adjustment valve 125 corresponding to the indoor unit 2 that performed heating operation lastly after stopping the first pump 21a at an extremely small opening area such that no heat medium flow therethrough to make the flow path of the heat medium close (VT3). Then, processing at the time of switching from cooling-main operation mode to cooling only operation mode is terminated (VT4).

Figure 18:
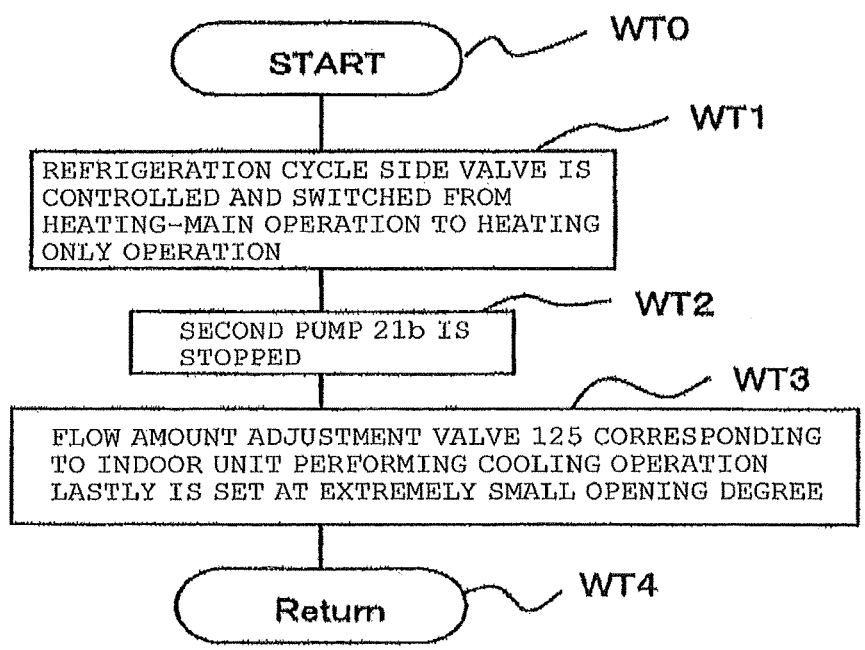
FIG. 18 is a flowchart showing the processing flow at the time of switching from the heating-main operation mode to the heating only operation mode.

FIG. 18 is a flowchart showing the processing flow at the time of switching from the heating-main operation mode to the heating only operation mode. Based on FIG. 18, descriptions will be given to the processing flow at the time of switching from the heating-main operation mode to the heating only operation mode. As explained in FIG. 15, at the time of cooling-heating simultaneous operation in which cooling operation and heating operation are mixed, that is, at the time of switching operation mode from the cooling-main operation mode or the heating-main operation mode, switching should be performed while paying attention to the order of ON/OFF of the compressor 10 and the pump 21.

The controller 60 starts processing at the time of switching from the heating-main operation mode to the heating only operation mode by the operation instruction input from the remote controller (WT0). That is, the controller 60 switches the heat source side refrigerant flow at the refrigeration cycle side from the heating-main operation mode to the heating only operation mode (WT1). Then, the controller 60 stops the second pump 21b at the cooling side (WT2). When the second pump 21b is stopped prior to the switching of the operation mode, since the heat source to evaporate the refrigerant disappears, low-pressure of the refrigerant decreases, possibly resulting in freezing of the heat medium.

However, by switching operation modes in such an order mentioned above, mode switching can be performed safely. The controller 60 sets the flow amount adjustment valve 125 corresponding to the indoor unit 2 that performed cooling operation lastly after stopping the second pump 21b at an extremely small opening area such that no heat medium flow therethrough to make the flow path of the heat medium close (WT3). Then, processing at the time of switching from heating-main operation mode to heating only operation mode is terminated (WT4).

Figure 19:
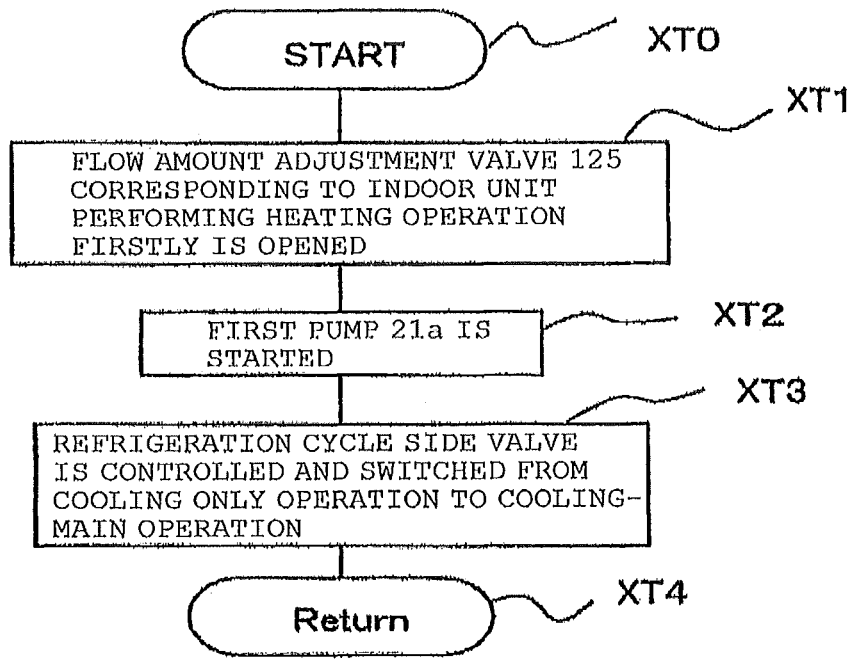
FIG. 19 is a flowchart showing the processing flow at the time of switching from the cooling only operation mode to the cooling-main operation mode.

FIG. 19 is a flowchart showing the processing flow at the time of switching from cooling only operation mode to cooling-main operation mode. Based on FIG. 19, descriptions will be given to the processing flow at the time of switching from cooling only operation mode to cooling-main operation mode. At the time of the cooling-heating simultaneous operation in which cooling operation and heating operation are mixed, that is, at the time of switching operation mode to cooling-main operation mode or heating-main operation, switching should be performed while paying attention to the order of ON/OFF of the compressor 10 and the pump 21.

The controller 60 starts processing at the time of switching from cooling only operation mode to cooling-main operation mode by the operation instruction input from the remote controller (XT0). That is, the controller 60 opens the flow amount adjustment valve 125 corresponding to the indoor unit 2 that performs heating operation firstly (XT1). Then, the controller 60 starts the first pump 21a at the heating side (XT2). Then, the controller 60 switches the operation mode to be stopped to cooling-main operation mode (LT3).

When the operation mode is switched prior to the start of the first pump 21a, high-pressure of the refrigerant increases and operation efficiency is deteriorated, possibly resulting in an abnormal stop. However, by switching operation modes in such an order mentioned above, mode switching can be performed safely. As shown in XT1, the flow amount adjustment valve 125 corresponding to the indoor unit 2 having a heating load has to be made open before starting the first pump 21a and the heat medium flow path has to be secured.

Figure 20:
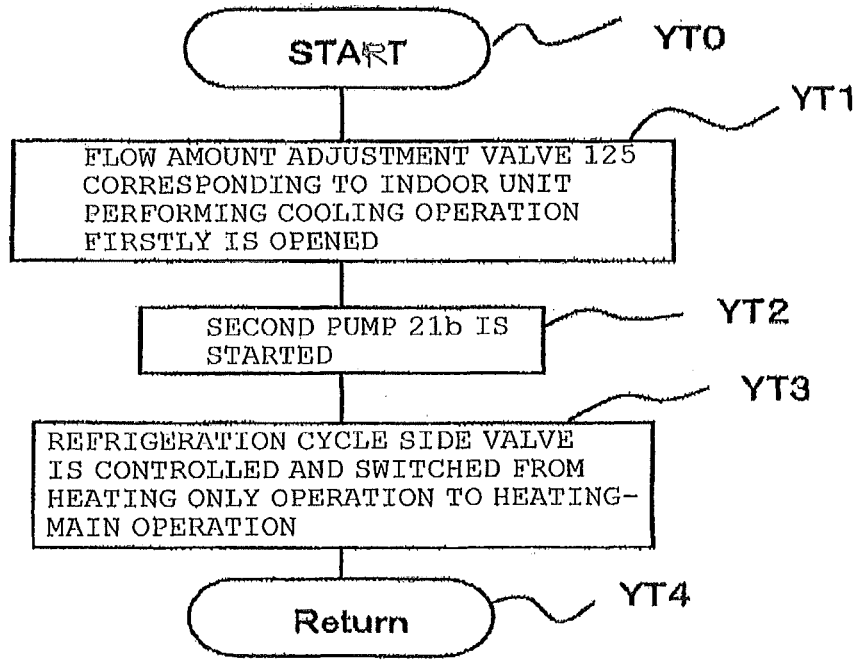
FIG. 20 is a flowchart showing the processing flow at the time of switching from the heating only operation mode to the heating-main operation mode.

FIG. 20 is a flowchart showing the processing flow at the time of switching from the heating only operation mode to the heating-main operation mode. Based on FIG. 20, descriptions will be given to the processing flow at the time of switching from the heating only operation mode to the heating-main operation mode. At the time of cooling-heating simultaneous operation in which cooling operation and heating operation are mixed, that is, at the time of switching operation mode to the cooling-main operation mode or the heating-main operation, switching should be performed while paying attention to the order of ON/OFF of the compressor 10 and the pump 21.

The controller 60 starts processing at the time of switching from the heating only operation mode to the heating-main operation mode by the operation instruction input from the remote controller (YT0). That is, the controller 60 opens the flow amount adjustment valve 125 corresponding to the indoor unit 2 that performs cooling operation firstly (YT1). Then, the controller 60 starts the second pump 21b at the cooling side (YT2). Then, the controller 60 switches the operation mode to be stopped to the heating-main operation mode (YT3).

When the operation mode is switched prior to the start of the second pump 21b, since there is no heat source to evaporate the refrigerant, low-pressure of the refrigerant decreases, possibly resulting in freezing of the heat medium. However, by performing switching in such an order mentioned above, mode switching can be performed safely. As shown in YT1, the flow amount adjustment valve 125 corresponding to the indoor unit 2 having a cooling load has to be made open before starting the second pump 21b and the heat medium flow path has to be secured.

As mentioned above, in the air-conditioning apparatus 200 according to Embodiment 2, stop, start, or the switching of the operation mode of the compressor 10 is performed when stop, start, or the switching of the operation mode of the system is performed with the heat medium being circulated in the intermediate heat exchanger 15. Thereby, it is possible to have stable operation and to prevent the refrigeration cycle operation efficiency from being deteriorated such that high-pressure of the refrigerant becoming high or low, resulting in the improvement of system efficiency and energy-saving.

That is, by performing stop control and start control, the air-conditioning apparatus 200 does no longer fall into poor efficiency operation conditions such that high-pressure of the refrigeration cycle increases or low-pressure decreases, so that it is possible to improve the operation efficiency of the entire system including start and stop and to achieve high energy-saving. When switching from the cooling-main operation mode to the heating-main operation mode or from the heating-main operation mode to the cooling-main operation mode, since the first pump 21a and the second pump 21b are in operation in both operation modes, they can be switched as they are.

In Embodiments 1 and 2, a case is explained where both the first temperature sensor 31 and the second temperature sensor 32 are installed. However, in order to control the first pump 21a and the second pump 21b, any one of the first temperature sensor 31 or the second temperature sensor 32 may be installed, and the other temperature detection means need not be installed.

In Embodiments 1 and 2, descriptions are given to a case where a pseudo-azeotropic mixture refrigerant such as R410A and R404A, a non-azeotropic mixture refrigerant such as R407C, a refrigerant and its mixture that is regarded to have a smaller global warming potential such as $CF_3CF=CH_2$ including a double bond in the chemical formula, and a natural refrigerant such as carbon dioxide and propane are available as the heat source side refrigerant, the refrigerant is not limited thereto. In Embodiment 1, although an example in which the accumulator 17 is provided in the heat source apparatus 1, the same operation and the same effect can be expected without the same.

Generally, the heat source side heat exchanger 12 and the use side heat exchanger 26 are often provided with a fan and condensation and evaporation are promoted by an air blast, though, it is not limited thereto. For example, a heat exchanger such as a panel heater utilizing radiation may be used for the use side heat exchanger 26, and a water-cooled type heat exchanger that transfers heat by water and an antifreezing liquid for the heat source side heat exchanger 12. A heat exchanger of any type may be used as long as having a structure capable of dissipating or absorbing heat.

An example is given to a case in which the flow path switching valve 22, the flow path switching valve 23, the stop valve 24, and the flow amount adjustment valve 25 are provided while corresponding with each of the each use side heat exchanger 26, though it is not limited thereto. For example, to a single use side heat exchanger 26, two or more of them may be connected. In such a case, the flow path switching valve 22, the flow path switching valve 23, the stop valve 24, and the flow amount adjustment valve 25 connected with the same single use side heat exchanger 26 may be made to perform in the same way. Descriptions are given to a case where two intermediate heat exchangers 15 are provided, though, the number is not limited thereto. Three or more may be provided as long as configured to be able to cool and/or heat the heat medium.

A case is shown in which the flow amount adjustment valve 25, the third temperature sensor 33, and the fourth temperature sensor 34 are installed inside the second relay unit 3b, though, part of or all of them may be installed in the indoor unit 2. If they are installed in the second relay unit 3b, since heat medium side valves and pumps or the like are gathered in the same housing, there is an advantage that maintenance becomes easy. On the other hand, if they are installed in the indoor unit 2, since they can be handled like a conventional direct-expansion expansion valve in the indoor unit, usability is improved. Further, when they are installed in the vicinity of the use side heat exchanger 26, there are advantages that no impact is given by the heat loss of the extended pipelines and the air-conditioning load in the indoor unit 2 can be easily controlled.

The invention claimed is:
1. An air-conditioning apparatus, comprising:
at least one intermediate heat exchanger that exchanges heat between a refrigerant and a heat medium that is different from said refrigerant;

a refrigeration cycle with which a compressor, an outdoor heat exchanger, at least one expansion valve, and a refrigerant side flow path of said intermediate heat exchanger are connected via piping through which said refrigerant flows;

a heat medium circulation circuit with which a heat medium side flow path of said intermediate heat exchanger, a pump, and a use side heat exchanger are connected via piping through which said heat medium flows;

a first controller that is configured to control drive of said compressor; and a second controller that is configured to control drive of said pump, wherein said compressor, said outdoor heat exchanger, and said first controller are accommodated in a heat source device, said intermediate heat exchanger, said pump, and said second controller are accommodated in a relay unit, and said use side heat exchanger is accommodated in an indoor unit, a first and second controller are communicably configured, and said first and second controllers are configured to perform operation by communication to stop said pump after the stop of said compressor when stopping said compressor based on thermo-off due to decrease in air-conditioning load in said use side heat exchanger or an operation stop instruction.

2. An air-conditioning apparatus, comprising:

at least one intermediate heat exchanger that exchanges heat between a refrigerant and a heat medium that is different from said refrigerant;

a refrigeration cycle with which a compressor, an outdoor heat exchanger, at least one expansion valve, and a refrigerant side flow path of said intermediate heat exchanger are connected via piping through which said refrigerant flows;

a heat medium circulation circuit with which a heat medium side flow path of said intermediate heat exchanger, a pump, and a use side heat exchanger are connected via piping through which said heat medium flows;

a first controller that is configured to control drive of said compressor; and a second controller that is configured to control drive of said pump, wherein said compressor, said outdoor heat exchanger, and said first controller are accommodated in a heat source device, said intermediate heat exchanger, said pump, and said second controller are accommodated in a relay unit, and said use side heat exchanger is accommodated in an indoor unit, a first and second controller are communicably configured, and said first and second controllers are configured to perform operation by communication to stop said pump after the stop of said compressor when stopping said compressor based on thermo-off due to decrease in air-conditioning load in said use side heat exchanger or an operation stop instruction wherein a flow amount adjustment valve is provided that adjusts a flow amount of said heat medium to flow through said each use side heat exchanger at either inlet side or outlet side of the heat medium side flow path of said use side heat exchanger, and said second controller is configured to stop said pump before stopping all the heat medium flow paths by said flow amount adjustment valve corresponding to the last use side heat exchanger in operation when said last use side heat exchanger in operation is stopped.

3. The air-conditioning apparatus of claim 1, wherein said first and second controllers are configured to perform operation by communication to start said compressor after the start of said pump when starting said compressor based on the increase in air-conditioning load in said use side heat exchanger or an operation start instructions during the stop of said compressor.

4. The air-conditioning apparatus of claim 3, wherein a flow amount adjustment valve is provided that adjusts a flow amount of said heat medium to flow through said each use side heat exchanger at either inlet side or outlet side of the heat medium side flow path of said use side heat exchanger, and said second controller is configured to start said pump after controlling said flow amount adjustment valve corresponding to said use side heat exchanger having the operation instruction or an air-conditioning load to make the heat medium flow path an open state.

5. The air-conditioning apparatus of claim 1, comprising:

two or more of said intermediate heat exchangers, two or more of said pumps, and two or more of said use side heat exchangers, and being capable of performing cooling-heating mixed operation mode that provides heating energy and cooling energy with said use side heat exchanger, heating operation mode that provides only heating energy with said use side heat exchanger, or cooling operation mode that provides only cooling energy with said use side heat exchanger, wherein said first and second controllers are configured to perform at least one of operations by communication to stop at least one pump of said two or more pumps that does not correspond to an operation mode after switching operation mode when performing switching from cooling-heating mixed operation mode to heating operation mode or cooling operation mode and to perform switching said operation mode after starting said pump of said two or more pumps that has been stopped before switching the operation mode when switching from said heating operation mode or said cooling operation mode to said cooling-heating mixed operation mode.

6. The air-conditioning apparatus of claim 5, wherein a flow amount adjustment valve is provided that adjusts a flow amount of said heat medium to flow through said each use side heat exchanger at either inlet side or outlet side of the heat medium side flow path of said use side heat exchanger, and said second controller, when switching operation mode and stopping said pump that does not correspond to the operation mode, is configured to stop said pump before controlling said flow amount adjustment valve corresponding to the use side heat exchanger that does not correspond to the operation mode to make all the heat medium flow paths of the use side heat exchanger that does not correspond to the operation mode close.

7. The air-conditioning apparatus of claim 5, wherein a flow amount adjustment valve is provided that adjusts a flow amount of said heat medium to flow through said each use side heat exchanger at either inlet side or outlet side of the heat medium side flow path of said use side heat exchanger, and said controller, when making said pump start that has been stopped before switching operation mode, is configured to make said pump start after controlling said flow amount adjustment valve corresponding to the use side heat exchanger that corresponds to the operation mode to make the heat medium flow path open.

8. The air-conditioning apparatus of claim 2, wherein said flow amount adjustment valve is constituted by a two-way valve or a three-way valve.

9. The air-conditioning apparatus of claim 4, wherein said flow amount adjustment valve is constituted by a two-way valve or a three-way valve.

* * * * *